US012536657B2

(12) United States Patent
Rantalainen et al.

(10) Patent No.: US 12,536,657 B2
(45) Date of Patent: Jan. 27, 2026

(54) TEXTURE METRICS IN CANCER PROGNOSIS

(71) Applicant: Stratipath AB, Solna (SE)

(72) Inventors: Mattias Rantalainen, Solna (SE); Johan Hartman, Bromma (SE); Yinxi Wang, Solna (SE)

(73) Assignee: Stratipath AB, Solna (SE)

( * ) Notice: Subject to any disclaimer, the term of this patent is extended or adjusted under 35 U.S.C. 154(b) by 303 days.

(21) Appl. No.: 18/332,776

(22) Filed: Jun. 12, 2023

(65) Prior Publication Data
US 2024/0412354 A1 Dec. 12, 2024

(51) Int. Cl.
*G06T 7/00* (2017.01)
*G06N 20/00* (2019.01)
(Continued)

(52) U.S. Cl.
CPC ........... *G06T 7/0012* (2013.01); *G06N 20/00* (2019.01); *G06T 7/40* (2013.01); *G16H 30/40* (2018.01);
(Continued)

(58) Field of Classification Search
CPC . G06T 2207/20081; G06T 2207/30024; G06T 7/0012; G06T 2207/30096; G06T 2207/20084; G06T 2207/30068; G06T 7/11; G06T 7/40; G06T 7/00; G06T 2207/20076; G06T 2207/30004; G06T 2207/20021; G06T 7/529; G06T 9/002; G16H 50/30; G16H 50/20; G16H 30/40;
(Continued)

(56) References Cited

U.S. PATENT DOCUMENTS

| 7,418,123 | B2 * | 8/2008 | Giger | G06T 7/0012 382/132 |
| 8,712,142 | B2 * | 4/2014 | Rajpoot | G06T 7/0012 435/6.14 |

(Continued)

FOREIGN PATENT DOCUMENTS

| KR | 20210056869 A | * | 5/2021 | | G16H 50/70 |
| WO | WO-2021249520 A1 | * | 12/2021 | | G06N 3/045 |

OTHER PUBLICATIONS

Machine translation from Search of KR-20210056869-A (Year: 2021).*
(Continued)

*Primary Examiner* — Courtney Joan Nelson
(74) *Attorney, Agent, or Firm* — Noréns Patentbyrå AB

(57) ABSTRACT

There is provided a method for quantifying texture features in histological sample from a tumor sample, comprising:
receiving a digital image of the histological sample, then
dividing the digital image into a plurality of sub-areas, then
using a trained machine learning model to predict a presence of at least one biological feature for each of the sub-areas, where a probability for the presence of the biological feature is represented by a value, then
forming a data matrix by arranging the values for the probabilities of the biological features in the same way as the sub-areas are arranged in relation to the digital image, then
applying image analysis to the data matrix for a set of texture features, to produce a quantification of at least one texture feature.

10 Claims, 16 Drawing Sheets

(51) Int. Cl.
  *G06T 7/40* (2017.01)
  *G16H 30/40* (2018.01)
(52) U.S. Cl.
  CPC .............. *G06T 2207/20021* (2013.01); *G06T 2207/20076* (2013.01); *G06T 2207/20081* (2013.01); *G06T 2207/30068* (2013.01); *G06T 2207/30096* (2013.01)
(58) Field of Classification Search
  CPC .... G16H 10/40; G06V 2201/03; G06V 10/50; G06V 10/44; G06V 10/806; G06V 20/69; G06V 10/40; G06V 10/776; G06V 10/771; G06V 10/84; A61B 6/5217; A61B 5/7267; A61B 2576/00; A61B 6/502; A61B 10/0041; A61B 5/7275; A61B 6/5211; A61B 5/4312; G06N 3/045; G06N 20/00; G06N 3/08
  See application file for complete search history.

(56) References Cited

U.S. PATENT DOCUMENTS 10,192,099 B2 * 1/2019 Agaian ................... A61B 5/725
2022/0044762 A1 * 2/2022 Van Der Baan ....... G16H 50/20

OTHER PUBLICATIONS

Machine translation from Google Patents of WO-2021249520-A1 (Year: 2021).*
"The hallmarks of cancer" by Hanahan and Weinberg (Cell 100(1):57-70, 2000).
Abadi M, Agarwal A, Barham P, Brevdo E, Chen Z, Citro C, et al. TensorFlow:large-scale machine learning on heterogeneous systems. 2015.
Amadasun M, King R. Textural features corresponding to textural properties [Internet]. IEEE Transactions on Systems, Man, and Cybernetics. 1989. p. 1264-74. Available from: Hyperlink "http://dx.doi.org/10.1109/21.44046" http://dx.doi.org/10.1109/21.44046.
Benjamini Y, Hochberg Y. Controlling the False Discovery Rate: A Practical and Powerful Approach to Multiple Testing. Journal of the Royal Statistical Society: Series B (Methodo-logical) 1995;57:289-300. https://doi.org/10.1111/j.2517-6161.1995.tb02031.x.
Blume-Jensen P, Berman DM, Rimm DL, Shipitsin M, Putzi M, Nifong TP, Small C, Choudhury S, Capela T, Coupal L, Ernst C. Development and Clinical Validation of an In Situ Biopsy-Based Multimarker Assay for Risk Stratification in Prostate Cancer Biopsy Test for Discriminating Prostate Cancer Outcomes. Clinical cancer research. Jun. 1, 2015;21(11):2591-600.
Cobleigh MA, Tabesh B, Bitterman P, Baker J, Cronin M, Liu ML, Borchik R, Mosquera JM, Walker MG, Shak S. Tumor gene expression and prognosis in breast cancer patients with 10 or more positive lymph nodes. Clinical Cancer Research. Dec. 15, 2005;11(24):8623-31.
Early Breast Cancer Trialists' Collaborative Group (EBCTCG), Darby S, McGale P, Correa C, Taylor C, Arriagada R, et al. Effect of radiotherapy after breast-conserving surgery on 10-year recurrence and 15-year breast cancer death: meta-analysis of individual patient data for 10,801 women in 17 randomised trials. Lancet. Nov. 12, 2011;378(9804):1707-16.
Galloway MM. Texture analysis using gray level run lengths [Internet]. Computer Graphics and Image Processing. 1975. p. 172-9. Available from: Hyperlink "http://dx.doi.org/10.1016/s0146-664x(75)80008-6" http://dx.doi.org/10.1016/s0146-664x(75)80008-6.
Gerami P, Cook RW, Wilkinson J, Russell MC, Dhillon N, Amaria RN, Gonzalez R, Lyle S, Johnson CE, Oelschlager KM, Jackson GL. Development of a prognostic genetic signature to predict the metastatic risk associated with cutaneous melanoma. Clinical Cancer Research. Jan. 1, 2015;21(1):175-83.
Giri VN, Obeid E, Gross L, Bealin L, Hyatt C, Hegarty SE, Montgomery S, Forman A, Bingler R, Kelly WK, Dicker AP. Inherited mutations in men undergoing multigene panel testing for prostate cancer: emerging implications for personalized prostate cancer genetic evalua-tion. JCO Precision Oncology. May 2017;1:1-7.
Haralick RM, Shanmugam K, Dinstein I'hak. Textural Features for Image Classification . IEEE Transactions on Systems, Man, and Cybernetics. 1973. p. 610-21. Available from: http://dx.doi.org/10.1109/tsmc.1973.4309314http://dx.doi.org/10.1109/tsmc.1973.4309314.
He B, Bergenstråhle L, Stenbeck L, Abid A, Andersson A, Borg Å, et al. Integrating spatial gene expression and breast tumour morphology via deep learning. Nat Biomed Eng. Aug. 2020;4(8):827-34.
Irshad S, Bansal M, Castillo-Martin M, Zheng T, Aytes A, Wenske S, Le Magnen C, Guarnie-ri P, Sumazin P, Benson MC, Shen MM. A molecular signature predictive of indolent prostate cancer. Science translational medicine. Sep. 11, 2013;5(202):202ra122.
Kratz JR, He J, Van Den Eeden SK, Zhu ZH, Gao W, Pham PT, Mulvihill MS, Ziaei F, Zhang H, Su B, Zhi X. A practical molecular assay to predict survival in resected non-squamous, non-small-cell lung cancer: development and international validation studies. The Lancet. Mar. 3, 2012;379(9818):823-32.
Liu JC, Voisin V, Bader GD, Deng T, Pusztai L, Symmans WF, Esteva FJ, Egan SE, Zacksen-haus E. Seventeen-gene signature from enriched Her2/Neu mammary tumor-initiating cells predicts clinical outcome for human HER2+: ERα-breast cancer. Proceedings of the National Academy of Sciences. Apr. 10, 2012;109(15):5832-7.
OpenSlide: A vendor-neutral software foundation for digital pathology. J Pathol Inform. Jan. 1, 2013;4(1):27.
Perou CM, Sorlie T, Eisen MB, van de Rijn M, Jeffrey SS, Rees CA, et al. Molecular por-traits of human breast tumours. Nature. 2000. p. 747-52. Available from: http://dx.doi.org/10.1038/35021093).
S. Pölsterl, "scikit-survival: A Library for Time-to-Event Analysis Built on Top of scikit-learn," Journal of Machine Learning Research, vol. 21, No. 212, pp. 1-6, 2020.
Schmidhuber J. Deep learning in neural networks: An overview. Neural networks. Jan. 1, 2015;61:85-117.
Scikit-learn: Machine Learning in Python, Pedregosa et al., JMLR 12, pp. 2825-2830, 2011.
Seabold S, Perktold J. Statsmodels: Econometric and Statistical Modeling with Python. Proceedings of the Python in Science Conference 2010. https://doi.org/10.25080/majora-92bf1922-011.
Sokal RR, James Rohlf F. The comparison of dendrograms by objective methods. Taxon 1962;11:33-40. https://doi.org/10.2307/1217208.
Texture Indexes and Gray Level Size Zone Matrix. Application to Cell Nuclei Classification. Pattern Recognition and Information Processing (PRIP): 140-145.
Thibault G, Fertil B, Navarro C, Pereira S, Cau P, Levy N, et al. Shape and texture indexes application to cell nuclei classification. International Journal of Pattern Recognition and Artificial Intelligence 2013;27:1357002.
Vallon-Christersson J, Häkkinen J, Hegardt C, Saal LH, Larsson C, Ehinger A, et al. Cross comparison and prognostic assessment of breast cancer multigene signatures in a large population-based contemporary clinical series. Scientific Reports 2019;9. https://doi.org/10.1038/s41598-019-48570-x.
Van Griethuysen JJM, Fedorov A, Parmar C, Hosny A, Aucoin N, Narayan V, et al. Computational Radiomics System to Decode the Radiographic Phenotype [Internet]. vol. 77, Cancer Research. 2017. p. e104-7. Available from: http://dx.doi.org/10.1158/0008-5472.can-17-0339.
Virtanen P, Gommers R, Oliphant TE, Haberland M, Reddy T, Cournapeau D, Burovski E, Peterson P, Weckesser W, Bright J, Van Der Walt SJ. SciPy 1.0: fundamental algorithms for scientific computing in Python. Nature methods. Mar. 2020;17(3):261-72.
Wang M, Klevebring D, Lindberg J, Czene K, Grönberg H, Rantalainen M. Determining breast cancer histological grade from RNA-sequencing data. Breast Cancer Research. Dec. 2016;18(1):1-3.

(56) References Cited

OTHER PUBLICATIONS

Wang Y, Acs B, Robertson S, Liu B, Solorzano L, Wählby C, et al. Improved breast cancer histological grading using deep learning. Ann Oncol 2022;33:89-98.

Wang Y, Kartasalo K, Weitz P, Acs B, Valkonen M, Larsson C, Ruusuvuori P, Hartman J, Rantalainen M. Predicting molecular phenotypes from histopathology images: a transcrip-tome-wide expression-morphology analysis in breast cancer. Cancer Research. Jan. 1, 2021.

Woolf DK, Li SP, Detre S, Liu A, Gogbashian A, Simcock IC, et al. Assessment of the Spatial Heterogeneity of Breast Cancers: Associations Between Computed Tomography and Immunohistochemistry. Biomark Cancer 2019;11:1179299X19851513.

Zou H, Hastie T. Regularization and variable selection via the elastic net. Journal of the Royal Statistical Society: Series B (Statistical Methodology) 2005;67:301-20. https://doi.org/10.1111/j.1467-9868.2005.00503.x.

Wang, Y., Artificial intelligence for breast cancer precision pathology, Karolinska Institutet, ISBN 978-91-8016-845-8, made publicly available on Dec. 2, 2022.

* cited by examiner

TEXTURE METRICS IN CANCER PROGNOSIS

STATEMENT REGARDING PRIOR DISCLOSURES BY THE INVENTOR OR A JOINT INVENTOR

The following disclosure is submitted under 35 U.S.C. 102(b)(1)(A): Disclosure: "Artificial intelligence for breast cancer precision pathology", Yinxi Wang, Karolinska Institutet, ISBN 978-91-8016-845-8, made publicly available on Dec. 2, 2022.

FIELD OF THE INVENTION

This invention relates to a method and a system for identification and quantification of textures in histology samples. The system and method may be used for diagnosis of disease, in particular diagnosis of cancer.

BACKGROUND

Texture metrics, such as the quantification of texture features, in histology samples is useful of diagnosis of various diseases.

Cancer progression or cancer recurrence refers to when a cancer reoccurs after surgery or other treatment. The risk for cancer progression for an individual patient is often used to select follow-on treatment for the patient after surgery of a primary tumor. The treatment is selected based on the risk for cancer progression, where a more aggressive treatment, such as chemotherapy, is used for patients with higher risk and a more conservative treatment is used for patients with low risk. Errors in determining the classification results in risks for under- or over treatment of the patient.

It would be useful if there were improved methods and systems for quantifying texture features that could be used for improved method of diagnosis, for example diagnosis of cancer. This invention solves this and other problems.

SUMMARY OF INVENTION

In a first aspect of the invention, there is provided a method for quantifying texture features in histological sample from a tumor sample, comprising:
  a) receiving a digital image of the histological sample, then
  b) dividing the digital image into a plurality of sub-areas, then
  c) using a trained machine learning model to predict a presence of at least one biological feature for each of the sub-areas, where a probability for the presence of the biological feature is represented by a value, then
  d) forming a data matrix by arranging the values for the probabilities of the biological features in the same way as the sub-areas are arranged in relation to the digital image, then
  e) applying image analysis to the data matrix for a set of texture features, to produce a quantification of at least one texture feature.

This is a new and innovative method of identifying hidden textures in a histology sample. By using predicted biological features, such as for example predicted gene expression patterns, textures can be identified simply and at low cost, without using wet lab. Texture metrics can be used for diagnosis, for example.

The inventors have surprisingly found that texture metrics, including quantification of multiple types of texture features, in original images of histology samples or digitally processed histopathology sample images, are useful for characterization and diagnosis of various disease in general and in particular for measuring and quantifying spatial variability in sample (intra-sample heterogeneity).

In various embodiments the trained machine learning model of step c) has been obtained by:
  i. receiving a training first data set comprising a plurality of digital images of histological samples and data representing quantification of the biological feature in the tumors from which the histological samples were taken, to a machine learning model; and then
  ii. correlating the presence of the biological feature to features in the images, to produce a trained machine learning model.

In various embodiments, the method comprises:
  A. receiving a second dataset comprising a plurality of images of histological samples from cancer patients where a clinical outcome for each of the patients is known,
  B. carrying out steps a)-e) for each of the digital images received in step A, to obtain a third training data set comprising quantifications, for each of the images, of at least one texture feature, and clinical outcome data for the patients, then
  C. correlating the clinical outcome to the quantifications of the texture feature to obtain a second trained machine learning model.

In various embodiments the method comprises receiving a digital image of histological sample from a patient and carrying steps a) to e) for the image, in order to produce a quantification of at least one texture feature, and providing the quantification of the at least one texture feature to the second trained machine learning model to predict a clinical outcome for the patient.

In various embodiments, the biological feature may be gene expression, a protein expression, or a presence of a mutation.

In various embodiments step c) is carried out for a plurality of biological features. The plurality of biological features may be gene expression of genes comprised in a predefined set of genes.

In various embodiments, the histological samples are from breast cancer.

In a second aspect of the invention there is provided a system arranged to
  a) receive a digital image of the histological sample, then
  b) divide the digital image into a plurality of sub-areas, then
  c) using a trained machine learning model to predict a presence of at least one biological feature for each of the sub-areas, where a probability for the presence of the biological feature is represented by a value, then
  d) forming a data matrix by arranging the values for the probabilities of the biological features in the same way as the sub-areas are arranged in relation to the digital image, then
  e) applying image analysis to the data matrix for a set of texture features, to produce a quantification of at least one texture feature.

In a third aspect of the invention there is provided a system arranged to receive a digital image of a histological sample from a patient and configured to provide a diagnosis for the patient, where system is arranged to provide the digital image to a second trained machine learning model to which has been obtained by:

A. receiving a second dataset comprising a plurality of images of histological samples from cancer patients where a clinical outcome for each of the patients is known, B. carrying out the following steps a)-e) for each of the digital images received in step A, a) receiving a digital image of the histological sample, then b) dividing the digital image into a plurality of sub-areas, then c) using a trained machine learning model to predict a presence of at least one biological feature for each of the sub-areas, where a probability for the presence of the biological feature is represented by a value, then d) forming a data matrix by arranging the values for the probabilities of the biological features in the same way as the sub-areas are arranged in relation to the digital image, then e) applying image analysis to the data matrix for a set of texture features, to produce a quantification of at least one texture feature.

to obtain a third training data set comprising quantifications, for each of the images, of at least one texture feature, and clinical outcome data for the patients, then C. correlating the clinical outcome to the quantifications of the texture feature to obtain a second trained machine learning model.

In a fourth aspect of the invention there is provided a computer program product for quantifying texture features the computer program product comprising a non-transitory computer readable storage medium having program instructions embodied therewith, the program instructions executable by a device to:

a) receiving a digital image of the histological sample, then b) dividing the digital image into a plurality of sub-areas, then c) using a trained machine learning model to predict a presence of at least one biological feature for each of the sub-areas, where a probability for the presence of the biological feature is represented by a value, then d) forming a data matrix by arranging the values for the probabilities of the biological features in a same way as the sub-areas are arranged in relation to the digital image, then e) applying image analysis to the data matrix for a set of texture features, to produce a quantification of at least one texture feature.

DETAILED DESCRIPTION

Various embodiments described herein relate to histology, in particular digital images of histological samples from a disease, in particular cancer.

A histological sample from a biopsy is produced by methods well known in the art of pathology. Isolation of samples is carried out by conventional means. A sample of a tumor may be from a region of the body that has cancer or suspected of having cancer. The sample may be taken from a patient that previously has been diagnosed with cancer. The tumor may be a primary tumor. The sample is removed from the body of the patient. In breast cancer, the sample is often isolated in connection with surgical removal of the primary tumor. Tissue that includes the tumor is then saved for later analysis. A sample may also have been removed using core needle biopsy.

The sample is prepared by chemical treatment (for example by fixation using formaldehyde) and embedding in a second material, for example in paraffin. Typically, the sample is then sliced into thin slices or tissue sections (with a thickness of for example from 3 μm to 10 μm or from 4 μm to 5 μm) using for example a microtome. The sample may be stained so that morphology of the tissue is enhanced. Useful stains include hematoxylin and eosin staining. One or more sections are then selected and mounted on glass slides, for example glass slides that are suitable for microscopy. The stained and mounted sample section is referred to as a "histological sample" herein. The isolation of biopsies and samples and production of histological samples are carried out using conventional methods and technologies known in the arts of surgery, histology, and pathology.

Figure 1:
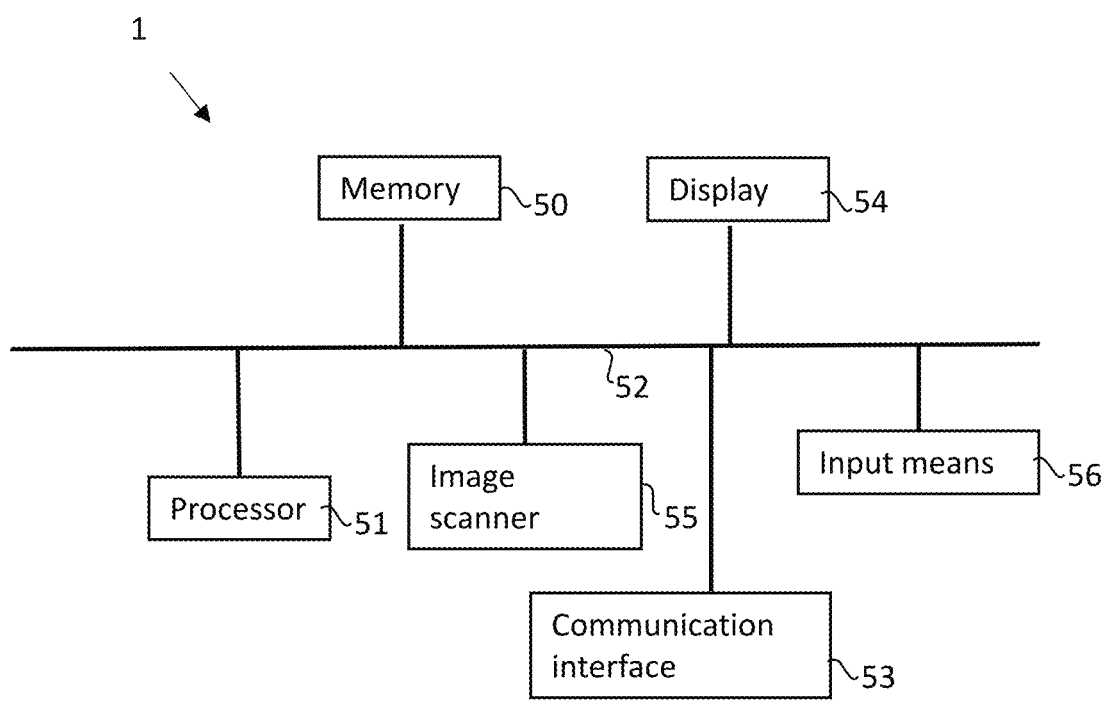
FIG. 1 is a schematic drawing of a system.

FIG. 1 shows various hardware components of a system 1, in accordance with some embodiments, including memory 50, processor 51, bus 52, communication interface 53, display 54, image scanner 55, such as a digital pathology slide scanner, and input means 56 (for example a mouse, keyboard or touch screen).

Digital images 30 of the histological samples are produced using conventional means. The histological samples may be scanned using an image scanner 55. Digital images may be captured with the use of a microscope or other arrangement that magnifies the histological sample in a suitable way.

In general, digital images 30 may be processed as follows. A digital image in a suitable format is produced for example by image scanner 55. The image typically represents a two-dimensional surface of the histological sample. The image may be a field of view taken at a suitable magnification such as from 20× to 40× magnification, equivalent to a pixel size of from 0.25/pixel μm to 0.50 μm/pixel (side of pixel). The digital image 30 is may be represented as a number of pixels arranged in a matrix pattern (bitmap image). The file format may be stored in a conventional bitmap arrangement or as an image pyramid. Suitable image formats include .jpg and .tiff but other file formats such as proprietary file formats may be used. The pixel size (width of pixel) may represent from about 0.25 μm to 8 μm of the histological sample. The image 30 may be a black- and white image (grayscale) or a color image.

A "biological feature" herein may be any useful biological feature that can be determined for a tumor. The biological feature may be a biomarker. The biological feature may be for example the expression level of a gene or a protein, or the presence of a mutation in a chromosome of a cell (such as a translocation or a point mutation). The biological feature may be a small molecule, such as for example lipid or choline (phosphocholine, free choline, and glycerophosphocholine). The biological feature may further be other features that are typical for tumors such as for example be the oxygenation level of the tumor, pH, degree of lymphocyte infiltration of the tumor, degree of vascularization or other features.

The biological feature may be a feature that is known to correlate with a property of the tumor such as survival, time to progression, treatment response, invasiveness, metastasis, type of tumor, etc., based on clinical or preclinical data. The biological feature may also be a feature that is known to be present in tumors but not in healthy tissue, such as a mutation, chromosome aberration, expression of certain proteins or genes that are not present in non-pathogenic tissue.

Typically, the biological feature, for example presence of one or more biomarkers, is determined for a sample of the tumor from which the histology sample, which is shown in a digital image 30, in particular a digital image 30 present in first training dataset 3. Hence the biological feature may be determined for the tumor or digital image 30 as a whole. However, in various embodiments, the spatial location of the biological feature is determined and mapped to a tile 31 (see below). This may for example be carried out by providing two neighboring sections of the tumor and producing a histological sample for one of the sections and determining the presence of the biological feature on the other section, where the biological feature is determined for at least two different areas, or a plurality of areas of the section. In some embodiments, the areas of the second section are mapped to tiles of the image of the first section. Alternatively, re-staining, or re-analysis, of the same tissue section with a different stain or assay may be used.

In some embodiment, the biological feature is the expression level, or existence, of a gene or a protein or the presence of chromosome aberration, referred to as a "biomarker" herein. In other embodiments the biological feature represents the expression level of a gene or a protein.

The biomarker may be a cancer biomarker. The biomarker may be selected for the type of tumor being studied. The biomarkers may for example be related to cell cycle control, tumor suppression, or growth factors of cancer cells, or other properties of cancer cells. The review "The hallmarks of cancer" by Hanahan and Weinberg (Cell 100(1):57-70, 2000) describe such properties of cancer cells and various useful biomarkers, and the skilled person is aware of a multitude of such biomarkers. Useful genes that can be included include various oncogenes such as HER2 (breast cancer) or mutated p53 (many types of cancer) or PSA (prostate cancer), RAS or MYC. Biomarkers may include biomarkers of non-tumor tissue such markers for proliferation or inactivation (such as PD-1) of the immune system or angiogenesis (such as VEGF). Non-protein coding genes such as genes producing long non-coding RNAs (lncRNAs) or micro RNAs (miRNAs) may also be used as biomarkers. Epigenetic markers, including for example DNA methylation may also be used as biomarkers.

Useful biomarkers for cancer include those of the PAM50 set for breast cancer: UBE2T, BIRC5, NUF2, CDC6, CCNB1, TYMS, MYBL2, CEP55, MELK, NDC80, RRM2, UBE2C, CENPF, PTTG1, EXO1, ORC6L, ANLN, CCNE1, CDC20, MKI67, KIF2C, ACTR3B, MYC, EGFR, KRT5, PHGDH, CDH3, MIA, KRT17, FOXC1, SFRP1, KRT14, ESR1, SLC39A6, BAG1, MAPT, PGR, CXXC5, MLPH, BCL2, MDM2, NAT1, FOXA1, BLVRA, MMP11, GPR160, FGFR4, GRB7, TMEM45B, ERBB2 (Perou C M, Sorlie T, Eisen M B, van de Rijn M, Jeffrey S S, Rees C A, et al. Molecular portraits of human breast tumours. Nature. 2000. page 747-52. Available from: http://dx.doi.org/10.1038/35021093).

Yet other useful biomarkers include: Bcl2, GRB7, TP53BP2, PR, GSTM1, IGFBP2, PRAME, CD68, BAG1, ER, MYBL2, KLK10, KRT14, p27, β-Catenin, AKT2, SCUBE2, ER (alternate), TBP, TOP2B, ZNF217, IGF1R (Cobleigh M A, Tabesh B, Bitterman P, Baker J, Cronin M, Liu M L, Borchik R, Mosquera J M, Walker M G, Shak S. Tumor gene expression and prognosis in breast cancer patients with 10 or more positive lymph nodes. Clinical Cancer Research. 2005 Dec. 15; 11(24):8623-31); ZNF671, PRC1, CDK1, ZWINT, LMNB1, PPP1R3B, TPX2, FOXM1, RACGAP1, SQLE, LIPT1, CENPF, KIF11, ESRP1, BUB1B, XPA, CRIM1, CCNB1, DCDC1, KIFC1, SLC7A4, TACC3, E2F8, AASS, KIF20A, GGCT, SDS, MGAM, FAM129A, GINS1, ZNF596, DLGAP5, DEPDC1, ESPL1 (Wang M, Klevebring D, Lindberg J, Czene K, Grönberg H, Rantalainen M. Determining breast cancer histological grade from RNA-sequencing data. Breast Cancer Research. 2016 December; 18(1):1-3); AURKB, CCNA2, SCRN1, NPY, ATP7B, CHAF1B, CCNB1, CLDN8, NRP1, CCR2, C1QB, CD74, VCAM1, CD180, ITGB2, CD72, ST8SIA4 (Liu J C, Voisin V, Bader G D, Deng T, Pusztai L, Symmans W F, Esteva F J, Egan S E, Zacksenhaus E. Seventeen-gene signature from enriched Her2/Neu mammary tumor-initiating cells predicts clinical outcome for human HER2+:ERα-breast cancer. Proceedings of the National Academy of Sciences. 2012 Apr. 10; 109 (15):5832-7).

Examples of suitable markers for prostate cancer include: FGFR1, PMP22, and CDKN1A. (Irshad S, Bansal M, Castillo-Martin M, Zheng T, Aytes A, Wenske S, Le Magnen C, Guarnieri P, Sumazin P, Benson M C, Shen M M. A molecular signature predictive of indolent prostate cancer. Science translational medicine. 2013 Sep. 11; 5(202): 202ra122- and Further suitable markers for prostate cancer include CUL2, DERL1, FUS, HSPA9, PDSS2, pS6, SMAD4, and YBX1 (Blume-Jensen P, Berman D M, Rimm D L, Shipitsin M, Putzi M, Nifong T P, Small C, Choudhury S, Capela T, Coupal L, Ernst C. Development and Clinical Validation of an In Situ Biopsy-Based Multimarker Assay for Risk Stratification in Prostate Cancer Biopsy Test for Discriminating Prostate Cancer Outcomes. Clinical cancer research. 2015 Jun. 1; 21(11):2591-600) and APC, BRCA1, BRCA2, MLH1, MSH2, PMS2, MSH6, CDH1, PTEN, STK11, TP53, ATM, BARD1, BMPR1A, BRIP1, CDK4, CDKN2A, CHEK2, EPCAM, MUTYH, NBN, PALB2, RAD51C, RAD51D, and SMAD (Giri V N, Obeid E, Gross L, Bealin L, Hyatt C, Hegarty S E, Montgomery S, Forman A, Bingler R, Kelly W K, Dicker A P. Inherited mutations in men undergoing multigene panel testing for prostate cancer: emerging implications for personalized prostate cancer genetic evaluation. JCO Precision Oncology. 2017 May; 1:1-7.)

Suitable biomarkers for Cutaneous Melanoma include BAP1b, MGP, SPP1, CXCL14, CLCA2, S100A8, BTG1, SAP130, ARG1, KRT6B, GJA1, ID2, EIF1B, S100A9, CRABP2, KRT14, ROBO1, RBM23, TACSTD2, DSC1, SPRR1B, TRIM29, AQP3, TYRP1, PPL, LTA4H, CST6 (Gerami P, Cook R W, Wilkinson J, Russell M C, Dhillon N, Amaria R N, Gonzalez R, Lyle S, Johnson C E, Oelschlager K M, Jackson G L. Development of a prognostic genetic signature to predict the metastatic risk associated with cutaneous melanoma. Clinical Cancer Research. 2015 Jan. 1; 21(1):175-83.)

Suitable biomarkers for non-squamous, non-small-cell lung cancer include BAG1, BRCA1, CDC6, CDK2AP1, ERBB3, FUT3, IL11, LCK, RND3, SH3BGR, WNT3A, ESD, TBP, YAP1 (Kratz J R, He J, Van Den Eeden S K, Zhu Z H, Gao W, Pham P T, Mulvihill M S, Ziaei F, Zhang H, Su B, Zhi X. A practical molecular assay to predict survival in resected non-squamous, non-small-cell lung cancer: development and international validation studies. The Lancet. 2012 Mar. 3; 379(9818):823-32.)

A person skilled in molecular biology or biochemistry is aware of a wide range of useful methods for detecting biomarkers in tumors. In general, gene expression is determined by quantifying the amount of mRNA transcript of a certain kind. Gene expression may be detected by for example various techniques such as RNA sequencing (RNA-Seq), PCR, such as quantitative PCR, such as RT-PCR, microarrays (in particular hybridization microarrays), or sequencing of expressed sequence tags (EST:s).

The presence of mutations may be detected using the above-mentioned methods but may also be determined at the DNA level with the use of various methods such as DNA sequencing, southern blot or in situ hybridization techniques.

Protein levels may be determined using any suitable method, including ELISA, western blot, mass spectrometry, immunohistochemistry (including quantification of immunohistochemistry), immunoprecipitation, microarrays with antibodies, Proximity Extension Assay (PEA) or 2D electrophoresis. Any suitable protein quantification technology, in particular various proteomics technologies, may be used.

The biological feature may be described by a continuous or discrete variable. Hence, a level of the presence of the biomarker may be determined or the biomarker may be determined as present or non-present. Examples of a continuous variable is for example gene expression level. Gene expression, for example for RNA-Seq, may for example be expressed as FPKM (fragments per kilobase of transcript per million fragments mapped), TPM (transcripts per kilobase million) or as other normalized expression measurements.

Example of a discrete variable may be "biomarker present" versus "biomarker not present", which in turn may be determined with a suitable threshold value. A threshold may be used, which can be determined by, for example, a distributional property (such as median, percentile), or through an optimization procedure where a relevant metric (or loss function) is optimized for e.g. prognostic performance, classification performance or regression performance (example include, mean squared error, sensitivity, specificity or overall classification accuracy, area under the receiver operating characteristic curve), or based on an established routine procedure used in, for example, an diagnostic assay. In some embodiments, data may be normalized.

In various embodiments a plurality of biological features are used. For example, the expression level of a panel of genes or proteins are detected or predicted. The number of biological features may for example be from 1 to 20,000, as described in more detail below. One example of a useful set of genes is the PAM50 panel of genes which comprises 50 genes relevant for breast cancer. Any useful set of biomarkers for cancer may be used.

Machine learning may incorporate supervised, self-supervised, unsupervised learning techniques or weakly supervised techniques. Neural networks, in particular deep neural networks is a useful technique. Machine learning and neural network as such are known and described elsewhere, see for example Schmidhuber J. Deep learning in neural networks: An overview. Neural networks. 2015 Jan. 1; 61:85-117. Start values for gradient decent may be provided to the untrained neural network by a user, but may also be generated randomly by a module in the system 1. Examples of useful neural network architectures include deep convolutional neural networks (for example, Inception V3 or V4, ResNet18 or 50, VGG, Xception, RexNext50) or other deep neural networks for image recognition.

Herein it is referred to untrained machine learning models and trained machine learning models. A "trained" machine learning model is a model where the parameters included in the model has been optimized, trained or fitted to capture some properties of data (irrespective of the training paradigm, e.g. supervised, unsupervised, self-supervised or weakly supervised) by using a training dataset and an optimization method.

Figure 2:
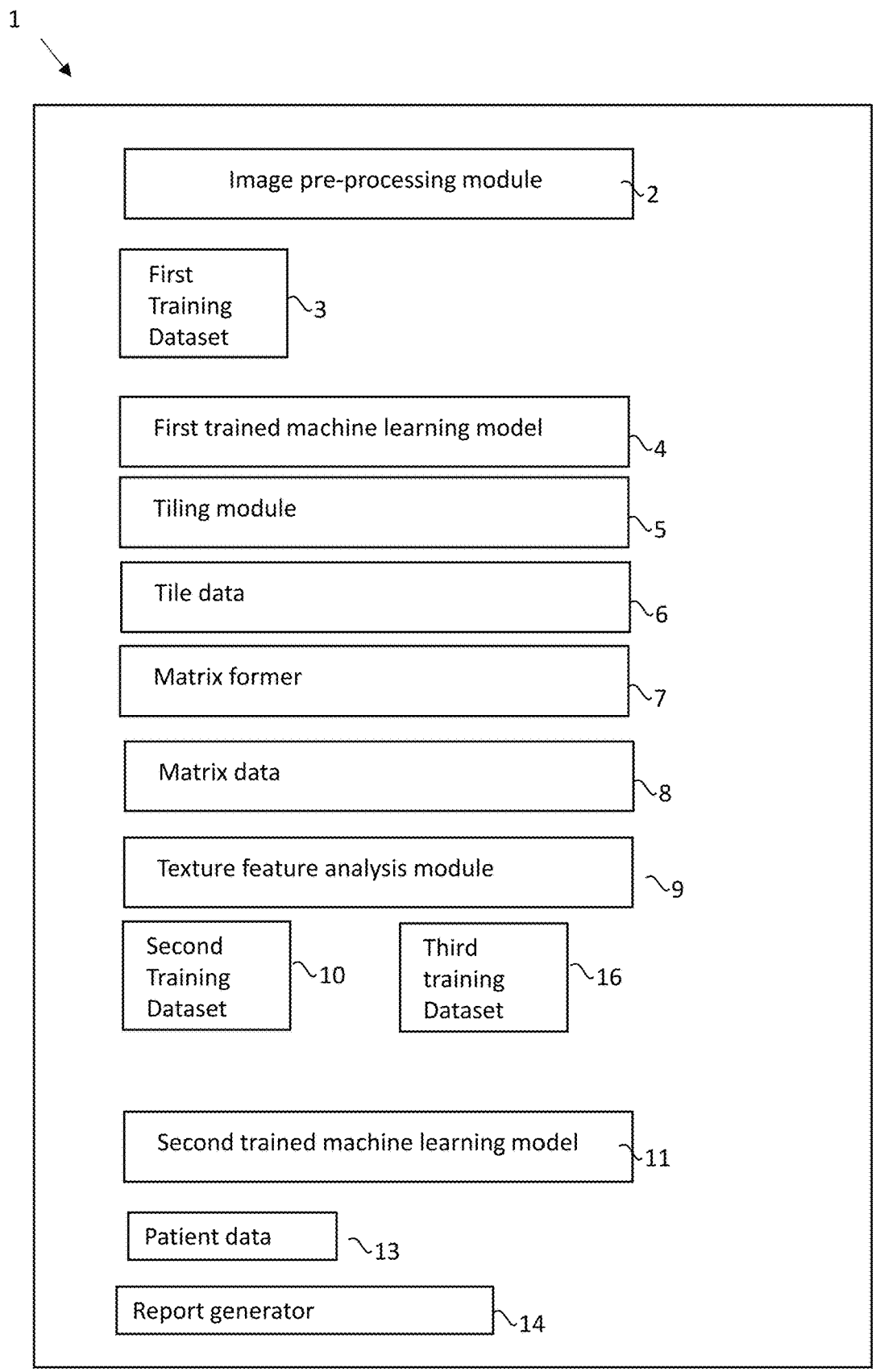
FIG. 2 is a schematic drawing of software components of a system in accordance with some embodiments.
Figure 3:
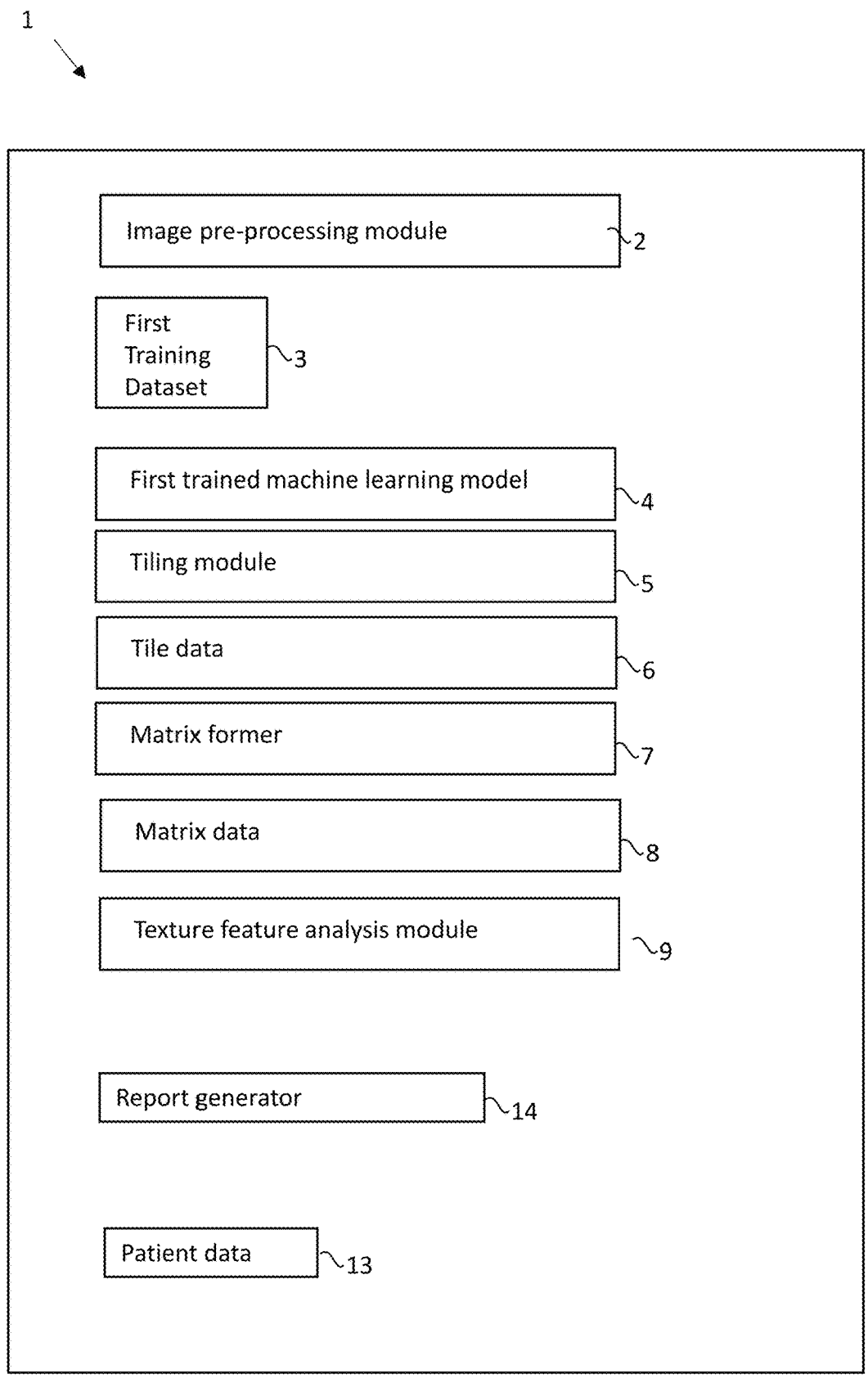
FIG. 3 is a schematic drawing of software components of a system in accordance with some embodiments.
Figure 4:
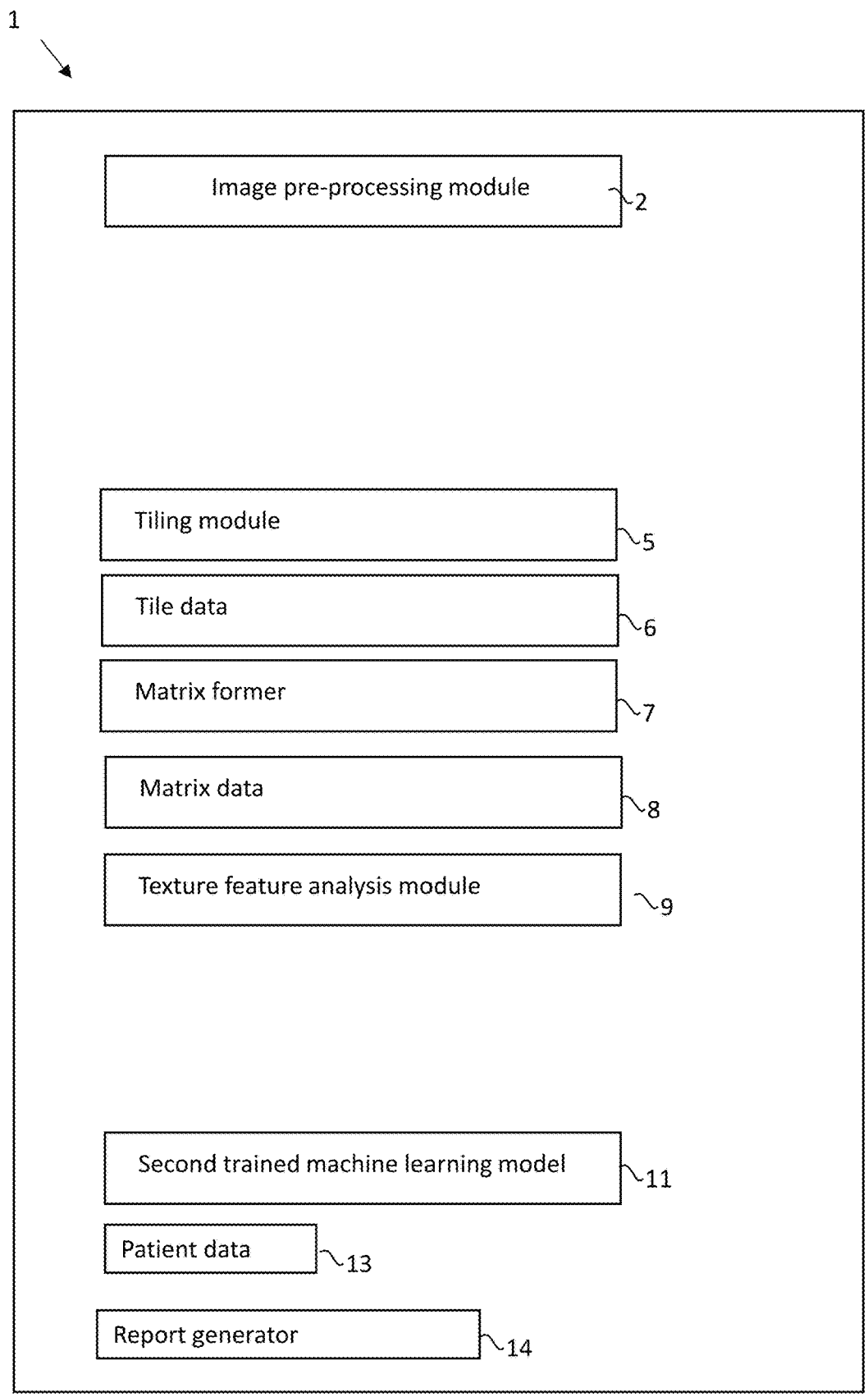
FIG. 4 is a schematic drawing of software components of a system in accordance with some embodiments.

FIG. 2 is an overview of various software components of the system 1, in accordance with some embodiments. It is to be noted that a system 1 does not necessarily need to comprise all components shown in FIG. 1. By way of example, FIG. 3 shows a system 1 for prediction texture features from an image and which therefore may lack some parts of system 1 of FIG. 2. FIG. 4 shows an embodiment of a system 1 that can be used for diagnosis, and which has some components of system 1 of FIG. 2.

Returning to FIG. 2, system 1 may comprise image pre-processing module 2, first training data set 3, first trained machine learning model 4, tiling module 5, tile data 6, matrix former 7, matrix data 8, texture feature analysis module 9, second training dataset 10, third training dataset 16, second trained machine learning model 11, patient data 13 and report generator 14. Report generator 14 is arranged for outputting quantification of at least one texture feature, a prediction of a clinical outcome for a patient. for a patient. Each of these will be described in more detail below. System 1 may also comprise scanning software able to produce an image file with data from image scanner 55.

Figure 5:
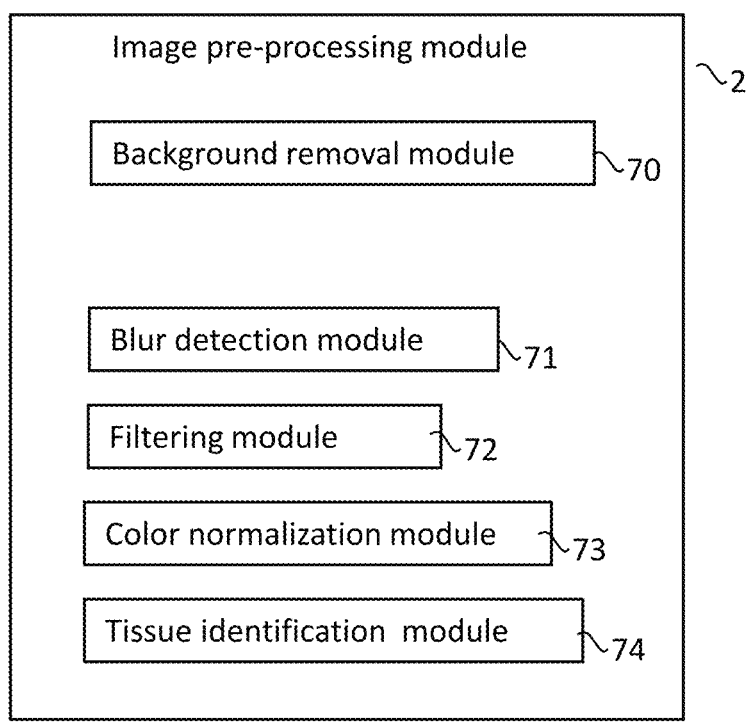
FIG. 5 is a schematic drawing of an image pre-processing module in accordance with some embodiments.

Scanned images 30 may be pre-processed before being used in any of the methods herein. Pre-processing may be carried out by pre-processing module 2 which may comprise, with reference to FIG. 5 background removal module 70, blur detection module 71, filtering module 72, color normalization module 73 and tissue identification module 74. Pre-processing may include one or more steps such as background removal, tiling, blur detection, filtering, color normalization, and pathogenic tissue detection (such as cancer tissue identification). The steps may be carried out in any suitable order. Methods that describe various useful pre-processing steps are described in Wang Y, Kartasalo K, Weitz P, Acs B, Valkonen M, Larsson C, Ruusuvuori P, Hartman J, Rantalainen M. Predicting molecular phenotypes from histopathology images: a transcriptome-wide expression-morphology analysis in breast cancer. Cancer Research. 2021 Jan. 1.

Pre-processing may include removal of background (non-tissue parts of image). This is done by background removal module 70. Blur detection may be carried out by blur detection module 71 to remove parts of images that are not in focus. Pre-processing may also include color normalization to account for variably in staining procedures across laboratories and also scanners used. This is done by color normalization module 73.

An image typically comprises both healthy tissue and cancer tissue. In one of the pre-processing steps, the parts of the image that do not represent cancer tissue are excluded. Hence such parts may be excluded from further processing. This can be done in different manners. In one embodiment, a pathologist identifies which pixels in the image that are cancerous, or which are healthy, or both. This information may for example be associated with the image file as metadata. The metadata may identify pixels or parts of the image that are cancerous or healthy. System 1 uses the information to exclude healthy tissue. Alternatively, identification is done by the system 1 itself for example by using machine learning, for example as described in Wang Y et al cited above. This step is carried out by tissue identification module 74.

Next, the images in the dataset may be filtered by filtering module 72. For example, small areas in the image that represent healthy tissue embedded in an area of invasive cancer may be filtered away. A single tile (when tiles are used) may be filtered away. Also, small cancer areas embedded by surrounding healthy tissue may be removed. A threshold, for example, a threshold for the number of pixels may be used. The threshold may be for example between from 300 pixels to 1000 pixels. Areas that are below the threshold may be excluded from downstream process steps.

The preprocessing steps may be carried out in any suitable order. Filtering step is, in some embodiments, carried out after tissue identification step. Blur detection step and color normalization step may be carried out before tissue identification step.

Sub-Areas, Tiling

Figure 6:
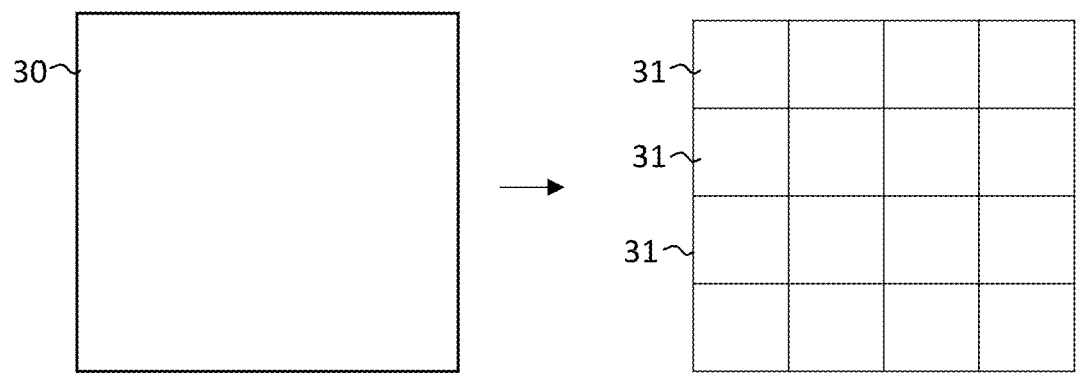
FIGS. 6 to 8 show examples of tiling procedures in accordance with some embodiments.
Figure 7:
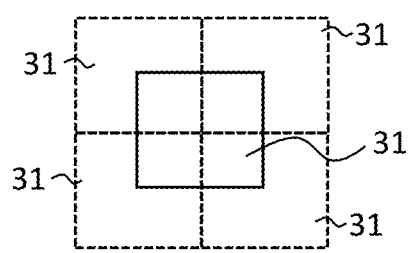
Figure 8:
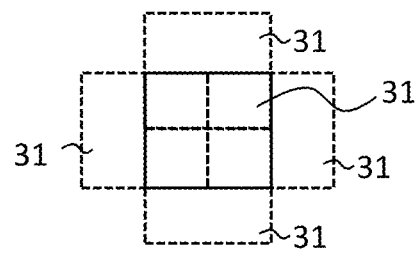
Figure 9:
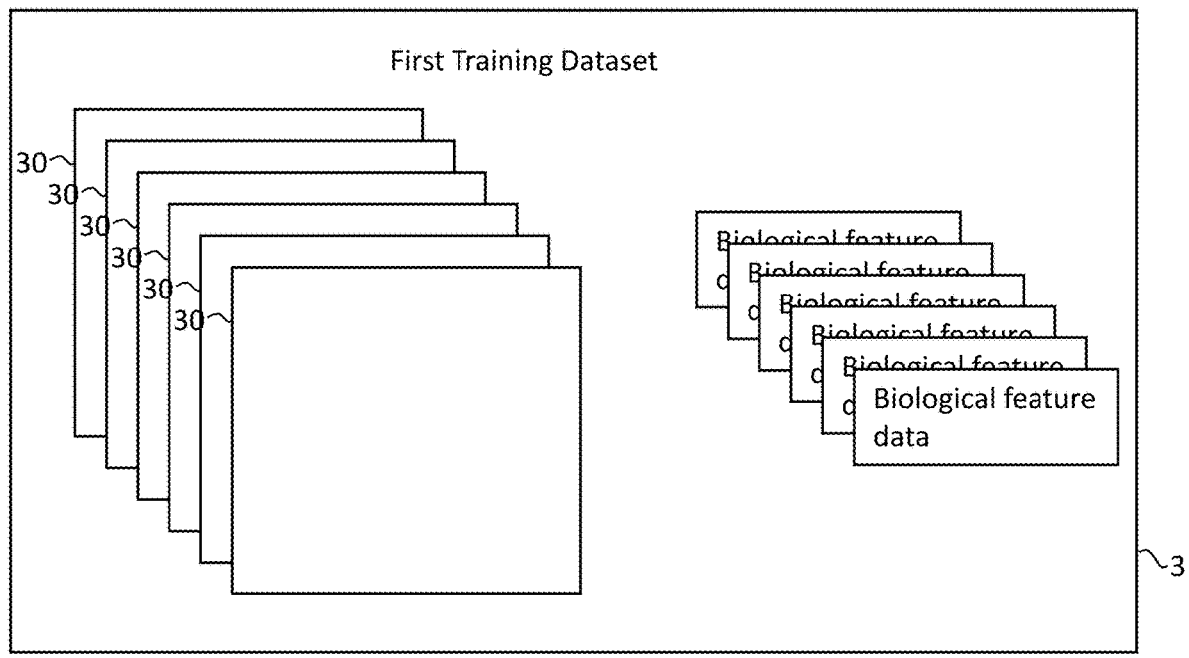
FIG. 9 shows a first training data set in accordance with some embodiments.

Digital images 30 may divided into sub-areas 31 by tiling module 5, as shown in FIGS. 6-8. One advantage with using sub-areas is that it breaks down one image 30 into smaller pieces which improves processing by the system 1. The sub areas 31 are, in some embodiments, rectangular such as square, referred to as tiles. The sub-areas 31 have equal size in some embodiments. The sub areas 31 may be arranged in a matrix pattern. Initially one image 30 may represent a histological sample with a size of about 1 mm-3 cm in diameter. One image 30 can suitably be divided into from 10 to 100 000 sub areas (tiles), or from 16 (4×4 tiles) to 99856 (316×316 tiles). The size of each tile is, in some embodiments, from 100×100 pixels to 5000×5000 pixels, more or from 500×500 pixels to 4000×4000 pixels. Each tile may consist of the same number of pixels. The size of the tile may be selected depending on the model and computational hardware used. The size of the tile may be selected by a user. Suitable software packages for carrying out the tiling and which may be included in the tiling module 5 includes Python, NumPy and OpenCV.

The tiles 31 may be overlapping such that some or all areas of image 30 are present in more than one tile 31. Examples are shown in FIGS. 7 and 8. In some embodiments, the tiles 31 do not share at least one edge. The overlap may be from 0%-90% of the area of a tile 31. An advantage with overlapping the tiles 31 is that features close to the edges of a tile 31 are assessed more accurately by the neural network. When the tiles 31 are square there may be overlap is in both the X and Y direction in the image plane. FIG. 7 shows an example of overlap where each tile 31, is overlapped by four other tiles 31 where each overlapping tile (dashed) covers 25% of the area of the first tile (solid line). FIG. 8 shows an image where each tile 31 is overlapped by four tiles, where each tile covers 50% of the area of the first tile.

The tiles 31 may be saved as image files in the system 1 (in first or second training dataset 3, 10) or saved as patient data 13 when the image 30 is used in diagnosis of a patient. The tile image file may be saved in the same way as the original image file. The same file format or a different file format may be used.

Predicting Biological Features

Figure 10:
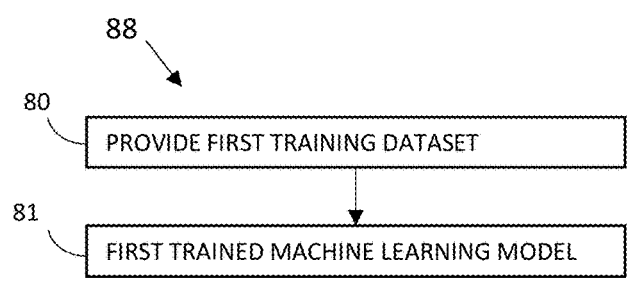
FIG. 10 is a flowchart for a method for creating a first trained machine learning model in accordance with some embodiments.

System 1 may comprise a first trained machine learning model 4, which is able to predict the presence of a biological feature, such as a biomarker, from a digital image of a histology sample. The first trained machine learning model 4 is may be obtained by the method 88 shown in FIG. 10, showing step 80: providing a first training data set 3 comprising a plurality of digital images 30 of histological samples of tumors and laboratory data representing quantification of the biological feature in the tumors from which the samples that were made into histological samples, were taken, to a (untrained) first machine learning model. Hence the first training data set 3 comprises a plurality of digital images 30 of histological samples and data for at least one biological feature for each of the tumors from which the histological sample was taken.

Step 81 comprises training a first machine learning model 4 using suitable training data. correlating the presence of the biological feature to features in the image, to produce a first trained machine learning model 4. The machine associates a biological feature to features in the image. For example, an optimization algorithm to minimize a relevant loss function that allow the machine learning model to learn associations between the biological feature and the features in the image. The laboratory data for the biological feature may have been produced with any suitable method mentioned above. An example of a trained machine learning model 4 is described in He B, Bergenstråhle L, Stenbeck L, Abid A, Andersson A, Borg Å, et al. Integrating spatial gene expression and breast tumour morphology via deep learning. Nat Biomed Eng. 2020 August; 4(8):827-34.

The first trained machine learning model 4 is able to predict at least one biological feature for a tile 31.

Texture Features

A method 110 for quantifying texture features will now be described with reference to FIGS. 11 and 12. The method may be used to provide various metrics for texture features such as quantification of texture features. The method is applied to a digital image 30 of a histology sample. The image 30 may first be preprocessed as described above. The image 30 is, in step 100, provided to the system 1 in some manner, for example using input means. The image 30 is stored in the memory 50 of the system 1. The image may be received by the system 1.

The image 30 is then, in step 101, divided into sub-areas (such as tiles) 31. Tiling is carried out by tiling module 5 as described above. Tile data 6, comprising the tile images 31 and information, such as coordinates about how the tiles 31 are arranged in relation to each other is created by tiling module 5. For example, in a coordinate system point 0,0 may define the upper left corner of the image 30, and each point in the coordinate system defines the upper left corner of a tile. Tile data 6 is stored in memory 50 of system 1. For example, a table stores coordinates for the tiles 31 in relation to the image 30 and pointers to the tile 31 image files. Tile data 6 makes it possible to arrange the tiles 31 or information related to the tiles 31, such as biological features, in the same way as they are arranged in the original image 30.

In step 102 each sub-area or tile 31 is then provided to the first trained machine learning model 4. The first trained machine learning model 4 predicts the presence, or quantity, of at least one biological feature, such as the presence a biomarker, for the tile 31. The quantity of the biological feature, or the probability that the biological feature is present, in the tile 31 is represented by a value. In certain embodiments, when the first trained machine learning model 4 is a neural network, representations from any of the model layers may be provided, for example from the second to last layer, in the neural network and provided as a multivariate representation of the biological feature. When tiles are overlapping, biological feature date may be treated as to capture a common feature of the overlapping tiles, such as average, maximum, or minimum values.

In step 103, a two-dimensional data matrix 32 is produced. This is done by arranging the values (parameters) from step 102 in a matrix 32 where each tile 31 is represented by one cell 33 in the matrix 32 and where each cell 33 has the biological feature data from the tile 31 from step 102. The cells 33 are spatially arranged in the same manner as the tiles 31 are arranged in relation to the original image 30. Tile data 6, such as coordinates of each tile 31, is used for this. For example, the coordinates of each tile 31 are used to build the matrix 32. This step may be carried out by matrix former 7. Matrix former 7 receives data from the first trained machine learning model 4 representing the variable for the biological feature and coordinates from tile data 6 in order to create the matrix 32. Matrix former 7 may comprise any suitable software packet such as for example NumPy. The data matrix 32 is stored as matrix data 8 in the memory 50 of the system 1.

Figure 11:
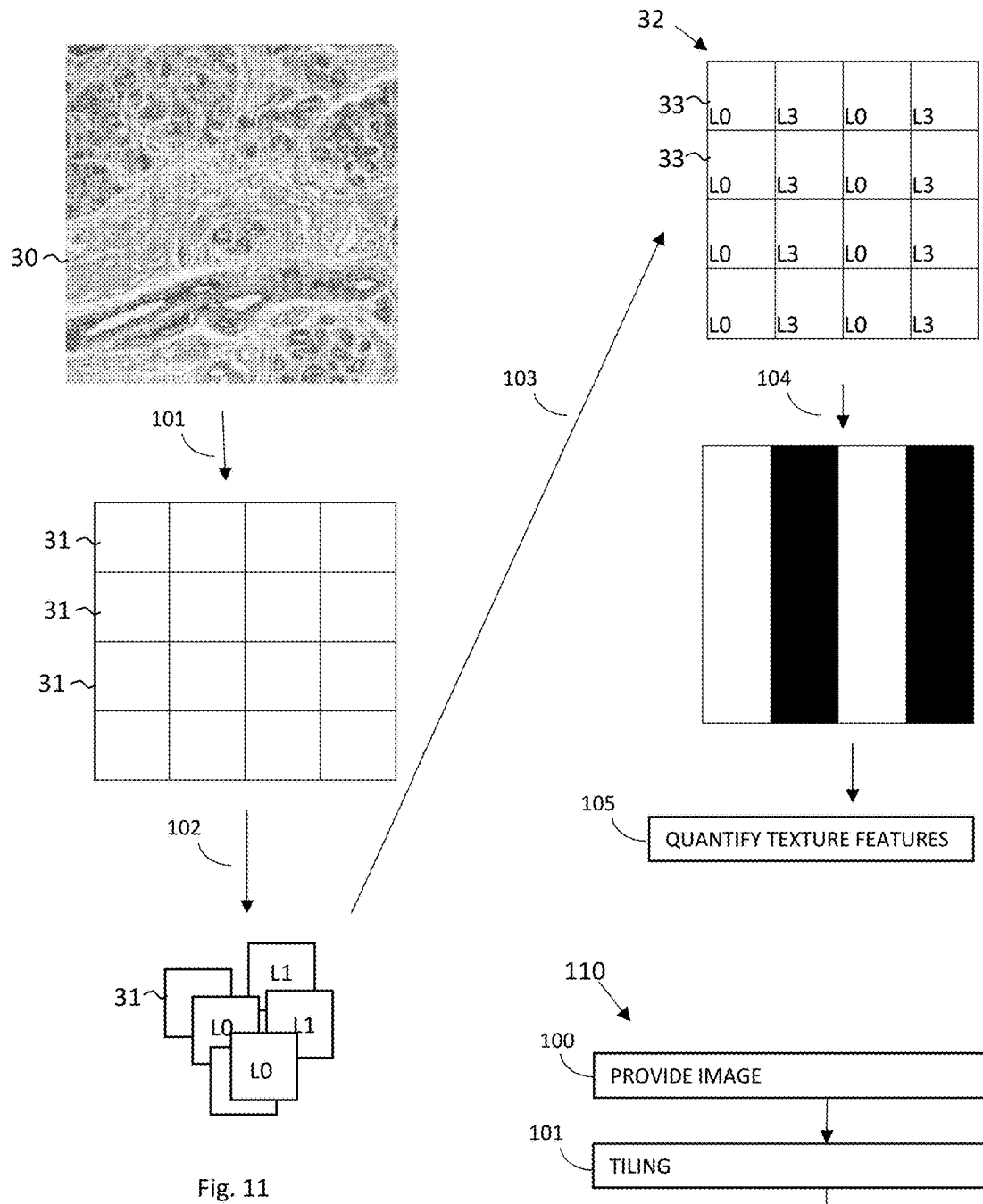
FIG. 11 schematically shows a method for quantifying texture metrics in accordance with some embodiments.

In FIG. 11, as an example two different expression levels (L0 and L3) of a gene are associated with each of the tiles 31 and the cells 33.

In step 104 image analysis is applied to the data matrix 32. The data matrix 32 is provided to the texture feature analysis module 9. The data matrix 32 may be treated as a bitmap image by texture feature analysis module 9. Texture feature analysis module 9 may comprise software that typically is arranged to analyze bitmap image files (such as for example .tiff or .jpg files, which may be considered as a two dimensional data matrixes). Image analysis may, for example, use one or more of the following methods:

Grey level co-occurrence matrix (GLCM) (Haralick R M, Shanmugam K, Dinstein I'hak. Textural Features for Image Classification. IEEE Transactions on Systems, Man, and Cybernetics. 1973. page 610-21. Available from: http://dx.doi.org/10.1109/tsmc.1973.4309314"http://dx.doi.org/10.1109/tsmc.1973.4309 314).

Neighborhood grey tone difference matrix (NGTDM) (Amadasun M, King R. Textural features corresponding to textural properties [Internet]. IEEE Transactions on Systems, Man, and Cybernetics. 1989. page 1264-74. Available from: http://dx.doi.org/10.1109/21.44046).

Grey-level run length (GLRL) (Galloway M M. Texture analysis using gray level run lengths [Internet]. Computer Graphics and Image Processing. 1975. page 172-9. Available from: http://dx.doi.org/10.1016/s0146-664x(75)80008-6).

Grey-level size zone matrix (GLSZM) (Texture Indexes and Gray Level Size Zone Matrix. Application to Cell Nuclei Classification". Pattern Recognition and Information Processing (PRIP): 140-145).

The various methods may be used to identify, for example, the following type of metrics: GLCM: Energy, Entropy, Contrast, Correlation; NGTDM: Contrast, Coarseness, Complexity, Busyness, Strength; GLRL: Long run emphasis; GLSZM: Long zone emphasis.

Useful software packages for image analysis include scikit-image and PyRadiomics. The texture feature analysis module 9 produces a quantification for a texture feature. In some embodiments, texture feature analysis module 9 produces quantification or metrics for a plurality, or at least three, or at least five or more than ten different texture features.

In some embodiments a plurality of biological features are predicted for each image 30 in step 102, where each biological feature results in one data matrix 32, and in some embodiments a plurality of texture features are quantified for each data matrix 32. For example, the number of biological features may be five and the number of texture features may be ten, which results in in 5×10=50 different values. However, any suitable number of biological features may be used, such as from 1 to 100 000 different biological features, or from 1 to 20 000 different biological features or from 1 to 1000 biological features, in particular from 10 to 100, or from 20 to 80. Any number of texture features such as from 1 to 100 may be used. In the example provided herein eleven different texture features are predicted for a set of fifty different genes.

In one embodiment, the plurality of biological features is gene expression of the PAM50 set of genes, which are fifty different genes that are relevant for breast cancer. In one embodiment, the texture metrics are chosen from GLCM, NGTDM, GLRL, GLSZM (GLCM: Energy, Entropy, Contrast, Correlation; NGTDM: Contrast, Coarseness, Complexity, Busyness, Strength; GLRL: Long run emphasis; GLSZM: Long zone emphasis).

The texture metrics may be provided to a report generator 14 to output a report. The report may for example be used by a pathologist or oncologist to make clinical decisions.

Machine Learning and Diagnosis

In some embodiments, texture metrics for a plurality of images 30 are used in a second training dataset 10 to produce a third training dataset 16 which is used to produce a second trained machine learning model 11. In some embodiments, the second training dataset 10 comprises images 30 from histology samples of tumors from a plurality of cancer patients, where clinical outcome data for the patient is known and present in the second training dataset 10. The clinical outcome of the patient is associated with the digital image 30 in the second training dataset 10.

The clinical outcome may be any useful treatment outcome such as a time-to-event outcome, e.g. survival (death) or time to local or distant relapse, time to progression, or treatment response, invasiveness, metastasis, type of tumor, etc. In some embodiments the clinical outcome is survival.

Figure 12:
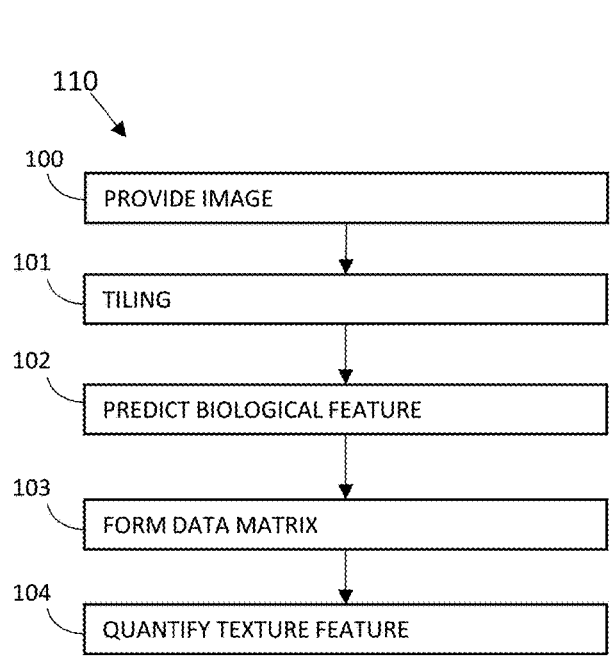
FIG. 12 is a flowchart showing the method of FIG. 9.
Figure 13:
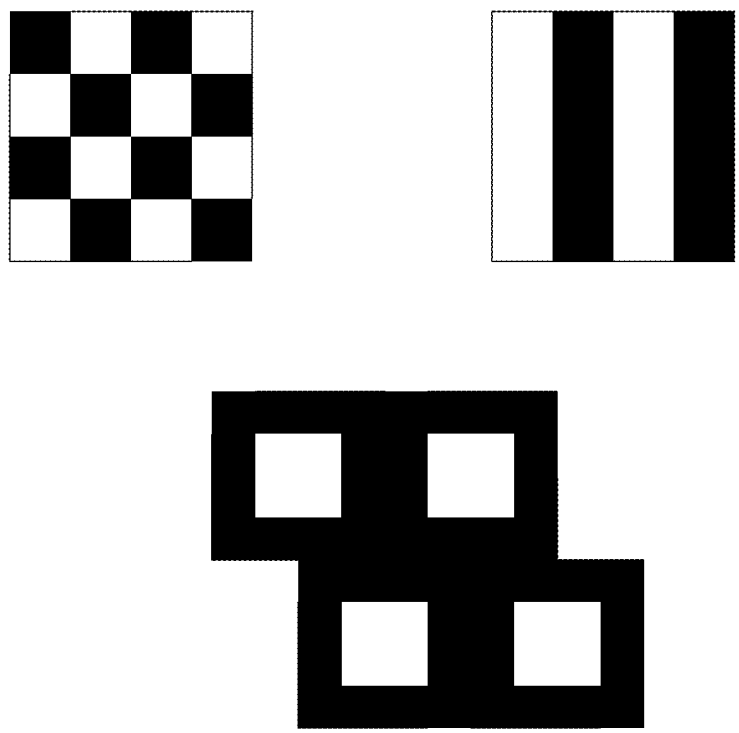
FIG. 13 are schematic examples of textures in accordance with some embodiments.
Figure 14A:
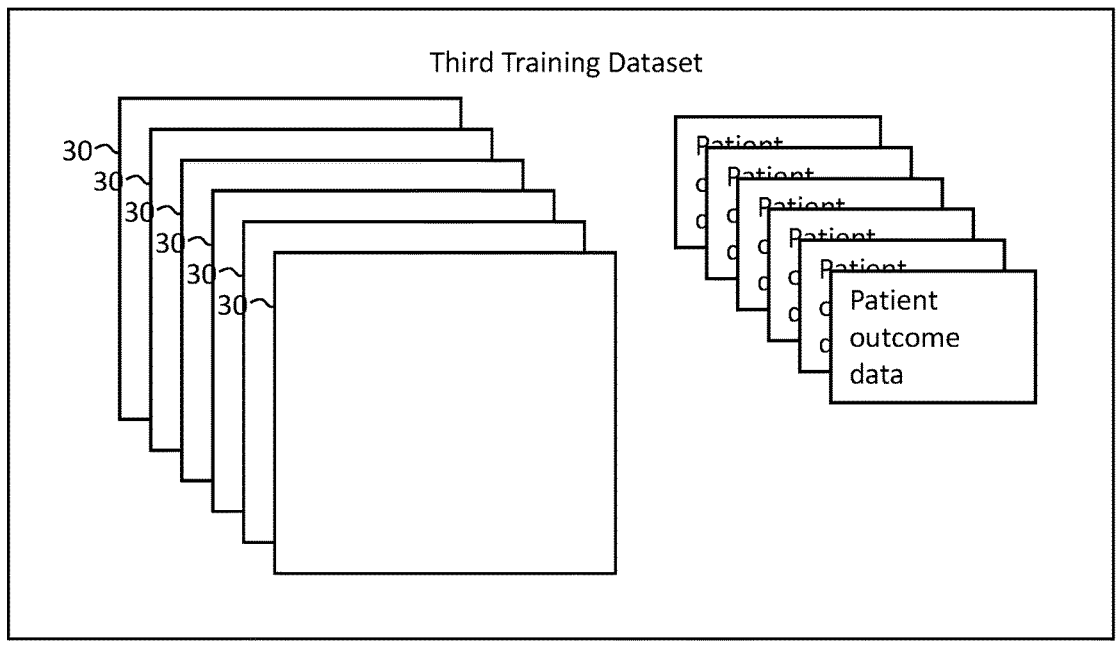
FIG. 14A is a schematic drawing of a second training dataset in accordance with some embodiments.
Figure 14B:
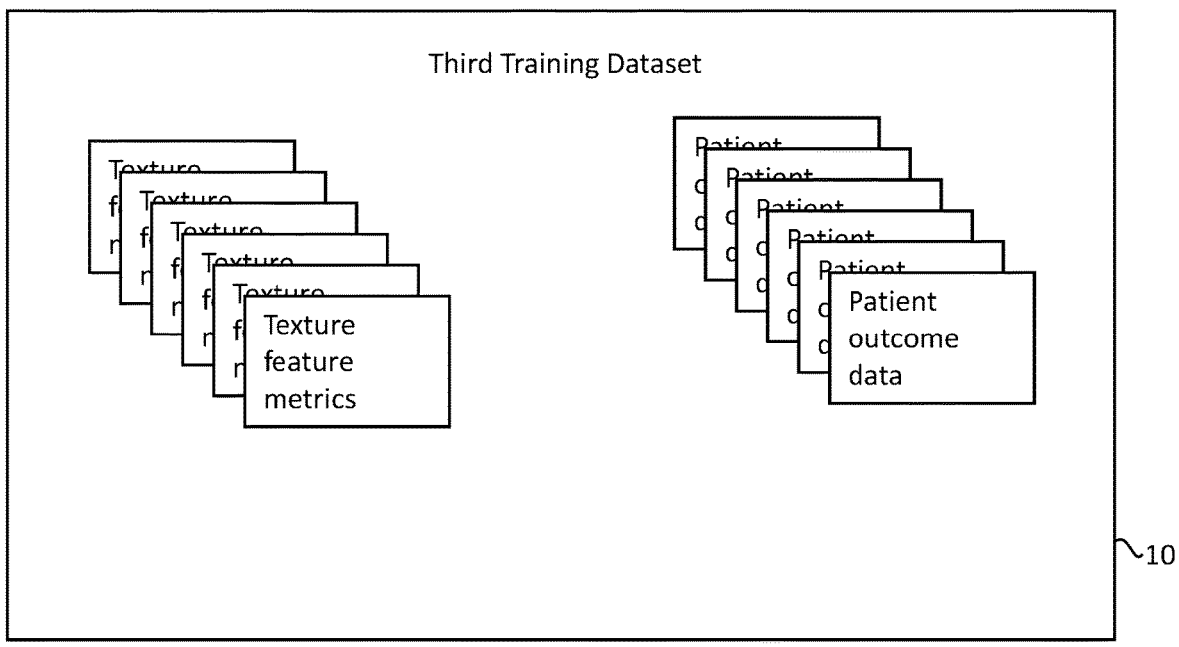
FIG. 14B is a schematic drawing of a third training dataset in accordance with some embodiments.
Figure 15:
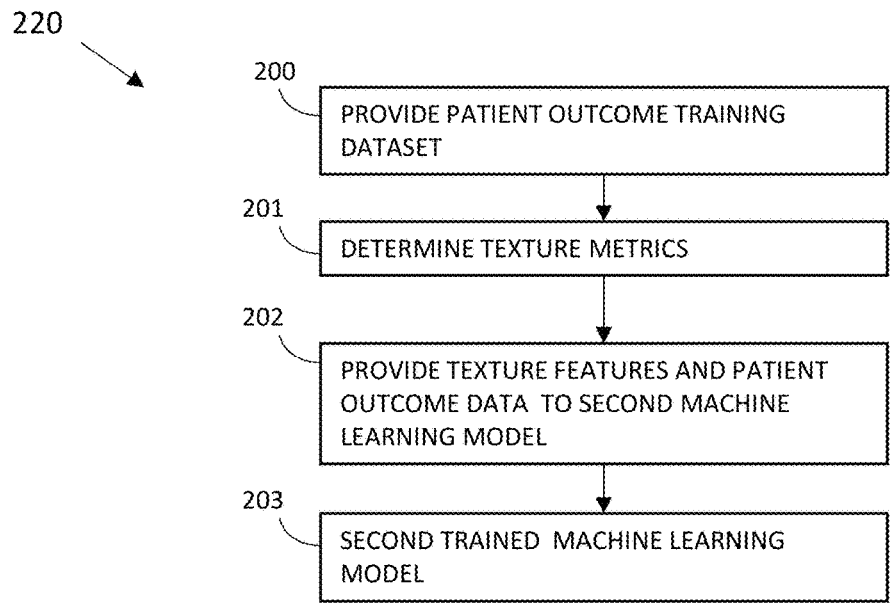
FIG. 15 is a flowchart that shows a method for creating a second trained machine learning model in accordance with some embodiments.

With reference to FIG. 15 method 220 may comprise the steps of 200 carrying out steps 110 of FIGS. 11-12 for each of the images 30 in the second training dataset, resulting in data representing quantification or metrics of texture features, such as a plurality of values for each patient (for example a plurality of biological features and a plurality of texture features are used). The thus determined metrics or quantification for each texture feature and the patient outcome data is comprised in a third training dataset 16. The patient outcome data may be handled in various manners. For example, patient ID may be used to import the patient outcome data into a table that also comprises quantification of the texture features or links to the quantification of the texture features. In one embodiment the second training dataset is comprised in a data structure (for example a database) to which the quantification of texture features is added after completion of step 201 for all images of second training dataset. Hence a data structure such as a table or database may comprise second training dataset 10 as well as third training dataset 16.

In step 202 the third training data set 16 is provided to a second machine learning model to provide a second trained machine learning model 11. The second machine learning model 11 correlates texture features to patient outcome to produce a trained second machine learning model 11 in step 203. Hence the method steps 200-202 produce a second trained machine learning model 11 that can be used to predict patient outcome and that can be used for diagnosis.

Figure 16:
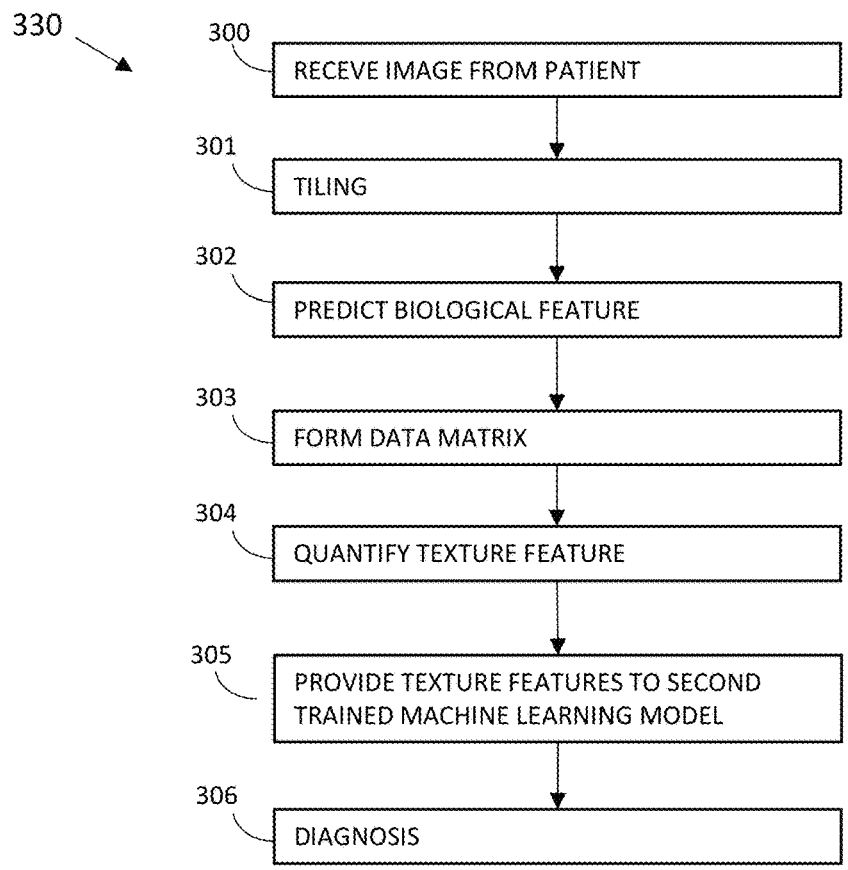
FIG. 16 is a flowchart that shows a method for diagnosis in accordance with some embodiments.

FIG. 16 shows a method 330 of diagnosis. Diagnosis may be a prediction any useful patient outcome as described herein, such as a time-to-event outcome, e.g. survival (death) or time to local or distant relapse, time to progression, or treatment response, invasiveness, metastasis, type of tumor, etc. In step 300 an image from a histology sample of a patient is received by the second trained machine learning model 11, which has been trained using the method of FIG. 15 (method 220). For example, a clinician may use input means 56 to upload an image 30 of a histology sample from a patient to memory 50 of system 1. The image 30 may be uploaded from a remote location, for example the data records system of a hospital or other health provider. The image 30 may be stored as patient data 13. Patient data 13 may also comprise other useful information such as the identity of the patient. The identity of the patient is logically associated with the image data and the tile data.

System 1 then carries out step 301 (tiling), step 302 prediction of at least one biological feature, step 303 data matrix 32 formation and step 304 quantification of at least one texture feature. Steps 301 are carried out in the same manner as steps 101 to 104 of method 110. At least some of the biological features and the texture features are the same as used for training the second trained machine learning model 11. In some embodiments the same biological features are predicted, and the same texture features are predicted and quantified. In some embodiments a subset of the texture features is used. In step 305 the data from step 304, i.e., quantification of texture features, is provided to the second trained machine learning model 11. The second trained machine learning model 11 receives the data from step 304. In certain embodiments, where the second trained machine learning model 11 is a neural network, data may be provided from any layer in the neural network, for example the second to last layer in the neural network and provided as a multivariate representation.

In step 306 second trained machine learning model 11 provides a diagnosis for the patient. The diagnosis may comprise for example, a risk score, a risk classification label or class probability, a subtype label or subtype class probability, a treatment response score or probability and may relate to patient outcome as described herein. Report generator 14 may generate a report that is provided to a user, for example on display 54.

In general, the methods and systems herein may be used to provide a diagnosis for any disease where histology is considered useful. Examples include cancer, such as for example for example breast cancer, prostate cancer, testicular cancer, lung cancer, colon cancer, rectal cancer, liver cancer, kidney cancer, cervix cancer, endometrial cancer, bladder cancer, melanoma or pancreatic cancer. The first and second training data sets 3, 10 may comprise images from histology sample of the same type of cancer that is diagnosed in method 330, such that breast cancer images is used in datasets 3 and 10 when breast cancer is diagnosed, prostate cancer images are used in dataset 3, 10 when prostate cancer is diagnosed, etc. The first and second datasets 3, 10 may have no images in common.

It should be noted that the second trained machine learning model 11 may not need to comprise the first training dataset 3 or the second training dataset 10. The first trained machine learning model 4 does not need to comprise the first training data set 3 or the second training dataset 10.

The training datasets 3, 10 can be arranged and stored in any suitable manner. A training dataset may for example be stored in a database, or a database may comprise pointers to a data store that has stored the image files. The images 30 in the datasets 3, 10 may be pre-processed and tiled before being used for training a machine learning model. The images in first dataset 3 may be different from images of second training dataset 10.

One patient may provide one, or at least one, digital image 30 from one tumor to a dataset. The number of images in first training data set may be at least 1000, or at least 5000. The same goes for second training dataset 10.

Figure 17:
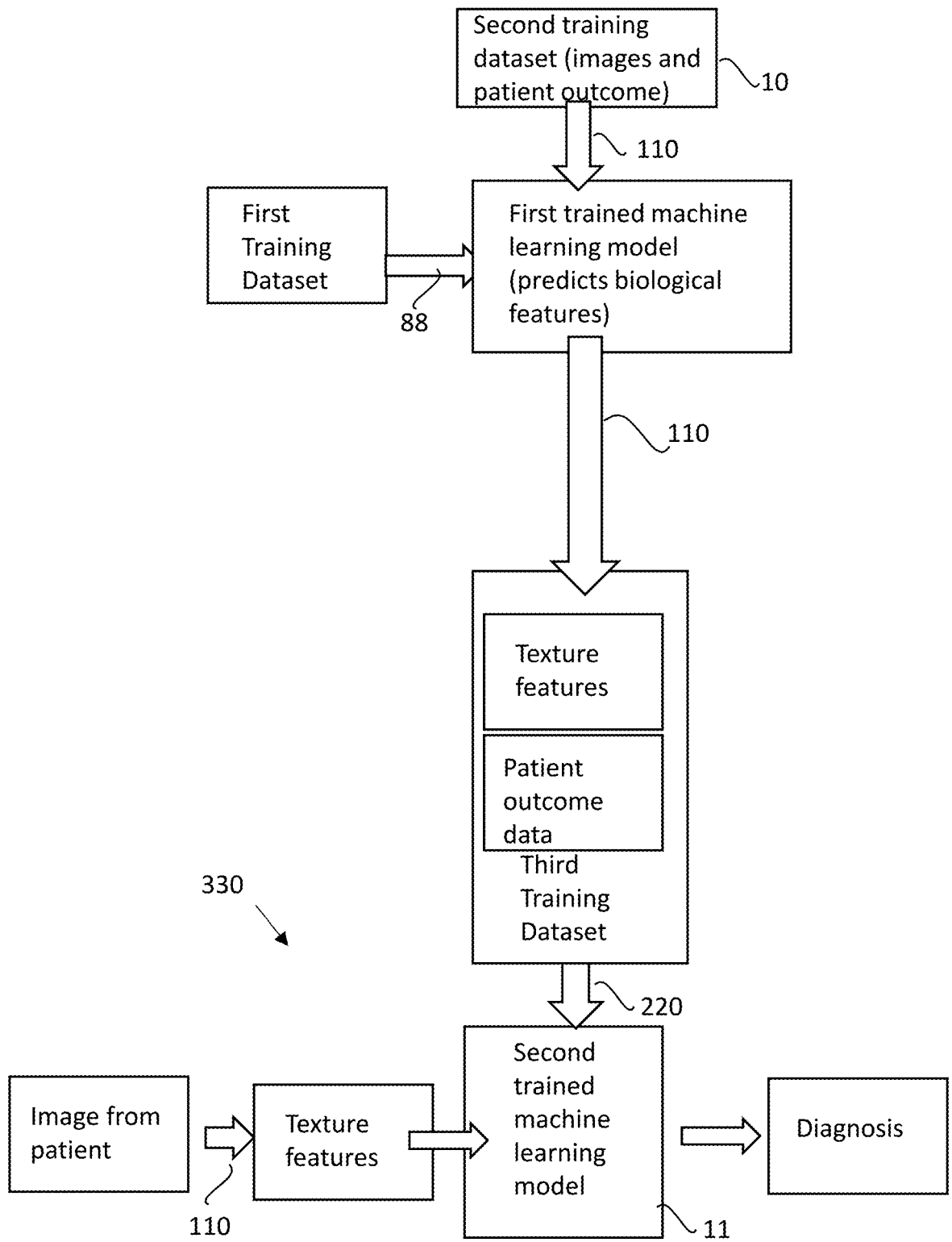
FIG. 17. Shows various methods and components in relation to each other in accordance with some embodiments.

FIG. 17 is an overview of various methods according to some embodiments. Method 88 is used to obtain first trained machine learning model 4 using first training dataset 3. The first trained machine learning model 4 is used to predict/quantify texture metrics using method 110. Method 110 may then be carried out for a second dataset 10 comprising plurality of images 30 from patients of which the clinical outcome is known to produce a third training dataset 16. Third training dataset 16 comprises texture metrics for a plurality of patients and data representing patient outcome. The third training dataset 16 is used to train a machine learning model to obtain a second trained machine learning model 11 using method 220. This second trained machine learning model 11 can be used for diagnosis of individual patients using method 330.

It is understood that the present methods and system is computer-implemented, using digital computer equipment. The various embodiments and components of system 1 described herein such as first, second and third training datasets 3, 10, 16 first and second machine learning models 4, 11 and image processing module 2, tiling module 5, tile data 6, matrix former 7, matrix data 8, texture feature analysis module 9, patient data 13 and report generator 14, and communication between these components uses digital computer technology for storing and handling digital information and signals as well as suitable hardware and software, including for example suitable digital processors, digital memories, input means, output means, buses and communications interfaces. System 1 may have an operating system.

A user may be able to make input using input means 56 for example a keyboard, a mouse, or a touch screen. Output, such as a report from report generator 14, may be provided on for example a display 54. A report may comprise a diagnosis for an individual patient.

The various parts of system 1 may be distributed across several physical entities such as memory units and processors. For example, training datasets may be stored remotely from rest of system 1. Memory 55 may be any type of memory and may involve cloud storage, for example.

The methods herein may be implemented with any suitable combination of software and hardware. Any suitable programming language may be used for the software units and methods described.

Data communication in system 1 may be implemented using suitable networking technologies and protocols. Data communication can be wireless, or wire bound. Information may be exchanged over a wide area net such as internet. Data communication in system 1 may be encrypted.

A user may be able to provide an image 30 remotely and receive a report from system 1 remotely. For example, a user may be able to use a client to upload an image file to a part of system 1 which is a server, and the server may provide the cancer progression risk to the client, for example provided in a report.

It is realized that everything which has been described in connection to one embodiment is fully applicable to other embodiments, as compatible. Hence, the invention is not limited to the described embodiments, but can be varied within the scope of the enclosed claims. While the invention has been described with reference to specific exemplary embodiments, the description is in general only intended to illustrate the inventive concept and should not be taken as limiting the scope of the invention. The invention is generally defined by the claims.

EXAMPLES

Method

Figure 18:
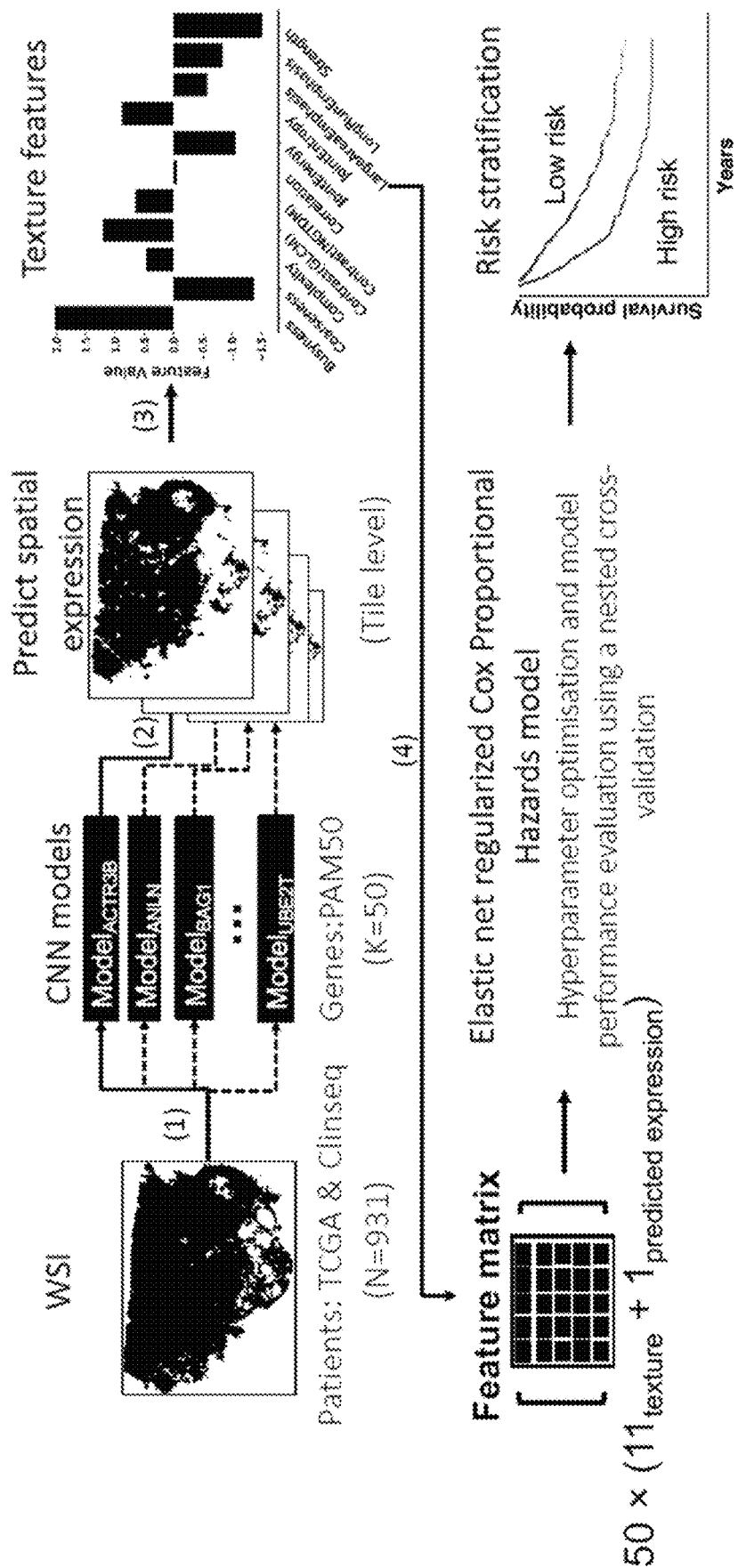
FIG. 18 Overview of the model optimization workflow. Deep learning models that were previously optimized to predict expression in the PAM50 gene panel were applied on each WSI (whole slide image). (2) Spatial predictions of gene expression levels were generated per gene and WSI. (3) Next, 11 texture features were extracted from spatially resolved gene expression patterns to quantify the level of intra-tumor heterogeneity of each slide. (4) Together with the slide level gene expression estimation from the deep learning model, for each patient, and each individual gene from the PAM50 gene panel, we collected 12 features, resulting in a total of 600 features per patient. Subsequently, a Cox proportional hazards model with elastic net regularization was then fitted on these features with a nested cross-validation approach. Finally, model predicted risk scores were applied to stratify patients into low- and high-risk groups using the median risk score among all patients.

An overview of the workflow is displayed in FIG. 18, with the following steps: (1) Deep neural networks were trained to predict gene expression in genes included in the PAM50 gene panel and applied to predict biological features in tiles from each WSI. (2) Spatial gene expression levels were predicted for each gene and each tile in each WSI. (3) eleven different texture metrics were calculated based on the spatially predicted gene expressions as measures of intra-tumor heterogeneity of each WSI. (4) WSI level predicted expression from the deep neural network model, for each patient and each individual gene in the PAM50 gene panel, were combined together with the 11 texture metric, resulting in 12 features in total for each gene, resulting in a total of 600 features per patient. Subsequently, time-to-event analysis was performed (Cox proportional hazards model with elastic net regularization) based on these features using a nested cross-validation approach. Finally, resulting predicted risk scores were utilized to stratify patients into low- and high-risk groups using the median risk score among all patients.

Dataset and Cohort

To train and validate the proposed model, patients from two data sources were merged: Clinseq-BC (N=256), and the Cancer Genome Atlas (TCGA-BC; N=675)(1). The model was further evaluated on two external test sets including SöS-BC-1 breast cancer cohort phase I (SöS-BC-1) (N=1,358) (2) and SCAN-B-Lund (N=1,262) (3). For each included patient from Clinseq-BC, SöS-BC-1 and SCANB-lund, the HE-stained formalin-fixed paraffin-embedded (FFPE) histopathology slides were scanned into whole slide images (WSIs) with Hamamatsu Nanozoomer XR (Hamamatsu Photonics) at 40× magnification (0.226 mm/pixel). For patients from TCGA-BC, the WSIs scanned at 40× were retrieved from https://portal.gdc.cancer.gov/. Only one WSI per patient was used.

RNA-seq data were available for patients from Clinseq-BC and TCGA-BC. Clinical data for patients from Clinseq, SöS-BC-1 and SCAN-B-Lund were obtained from Swedish National Breast Cancer Registry whereas for patients from TCGA-BC, the clinical data were extracted from the TCGA database as well as pathology reports (dbGAP projectID: 5621). CNN models that were previously optimized (1) for predicting expression levels of PAM50 genes were retrieved and applied on each WSI to obtain spatially resolved gene expression predictions per patient across all data sources.

The predicted spatial gene expressions from Clinseq-BC and TCGA-BC were subsequently used to train and validate the proposed model and external test sets (SöS-BC-1 and SCANB-lund) were used only once to give a final evaluation on generalizability of the proposed model.

Generation of Spatial Predictions

Each WSIs were tiled into image patches that covered an original region of 1196×1196 pixels (0.271×0.271 mm) with overlapping under 40× magnification and subsequently downscaled by a factor of 2 to form final tiles with 598×598 pixels in size. Overlapping between adjacent patches were 25% for slides from SöS-BC-1, and 50% percent for slides from other three cohorts. The coordinate information was preserved during tiling. The trained CNN models were then applied to obtain predicted gene expression levels for each tile for 50 genes from the PAM50 gene panel (4). Next, tile level predictions were mapped back to their original locations within a WSI using the coordinate information, configuring a spatial gene expression map. The predictions in overlapping regions were calculated as an average across all overlapped tiles. Given that the original WSI is too large to analyze and that the gene expression level was predicted in a unit of tiles, we thus shrunk each prediction map through down sampling by a factor of 598 to simplify the calculation of spatial heterogeneity features.

Extraction of Texture Features

For a given WSI, we obtained a spatial gene expression prediction from each individual gene that was subsequently used to extract a set of 11 features per WSI. These features were selected with the aim of capturing spatial heterogeneity of each gene expression pattern from either second or high order texture features with previously identified clinical relevance (5). The features consist of four major types, that belong to either second-order statistical method (grey-level co-occurrence matrix ('GLCM')(6), or higher order statistical methods including grey-level size zone matrix ('GLSZM')(7), grey-level run length matrix ('GLRLM')(8), neighborhood grey tone-difference matrix ('NGTDM')(9). PyRadiomics v.3.0.1 was used to extract all texture features. For each spatial gene expression prediction, we firstly discretized the continuous value to a fixed bin count of 4, and then computed features with default parameters associated with the package.

Development of Prognostic Model

We implemented an elastic net penalized Cox regression model (10) to predict the prognostic value of intra-tumor spatial gene expression heterogeneity. For patients from Clinseq-BC and TCGA-BC cohorts, and for each gene from the PAM50 gene panel, eleven texture features were extracted in the previously described manner; In addition, a slide level predicted gene expression value was also included, calculated by taking the mean of all tile level predictions across a given WSI. This resulted in a total of 600 predictors per patient included in the model.

To optimize hyperparameters that determine the degree of penalization (alpha and lambda) and to obtain an unbiased evaluation on prediction performance, we adopted a nested cross-validation (CV) approach. In the outer loop, we randomly split the patients into 10 folds, with 9 folds regarded as training and the other as test sets. The same procedure was repeated 10 times. The training set from the outer CV loop was then randomly split into 5 folds, forming the inner CV that was used to optimize hyperparameters. The shrinkage penalty (lambda) was chosen empirically while the relative weight between $\ell 1$ and $\ell 2$ penalties (alpha) was evaluated by grid search (0.0001, 0.001, 0.005, 0.1, 0.2, 0.3, 0.5, 0.7, 0.9). The hyperparameters that yield the best C-index within inner CV were adopted and the optimized model was used to predict on the held out test set in the outer CV fold. To account for batch differences, features from the training set were first normalized to zero mean and unit variance before fitting the model, and the test set features were normalized against the training set using the same estimated values.

For each individual in the test set from the outer CV loop, we can thus obtain a risk score which is the sum of products between feature values and coefficients derived from the Cox elastic net model. After concatenating predicted risk scores across all test sets, we restratified patients into low and high risk groups using the median risk score, and subsequently compared the survival outcomes between the dichotomized groups.

Evaluation on External Test Data Sets

The generalizability of the proposed model was evaluated on two external test sets, namely SCAN-B-lund and SöS-BC-1.

First, we performed a 30-round Monte-Carlo CV using Clinseq-BC and TCGA-BC cohorts with a training/test set ratio set to 80% and 20%. A model was optimized on training rounds and the predictions on test sets across all 30 rounds were concatenated. Same grid search strategy was employed as previously described and the optimal choices of alpha and lambda were reached by maximizing the C-index.

Finally, we refitted the model with optimized hyperparameters on training cohorts and applied it to dichotomize external test cohorts using the median value of predicted risk score obtained from each cohort. For a calibration purpose, each cohort was evaluated separately.

Prognosis Analysis

We compared recurrence-free survival (RFS) rates between identified low and high risk patient groups to evaluate whether intra-tumor heterogeneity could serve as an independent prognostic factor using the proposed model.

A recurrence event was considered if locoregional or distant relapses, metastasis, contralateral tumors or death was detected. Patient deceased without any reported metastasis was assumed to have an unidentified metastasis before death (11, 12).

The time-to-event interval was defined as the diagnostic date to the date when the first recurrence event was observed or the last follow-up date.

Univariable and multivariable Cox proportional hazards regression models were used to estimate unadjusted and adjusted hazard ratios (HRs) and corresponding 95% CI, respectively. In the univariable Cox regression model, only risk stratification was included to generate unadjusted HR. Same approach was used to calculate unadjusted HR for each individual texture and predicted gene expression feature selected by the Cox elastic net model. P-values were corrected for multiple testing using the Benjamini-Hochberg approach. In the multivariable Cox regression model, age, tumor size, lymph node status, ER status, HER2 status and grade were adjusted. Age was modelled as continuous value; tumor size was coded as ≥20 mm or <20 mm according to the diameter of the tumor; Lymph node status was determined based on whether there exists lymph node metastases; ER status was dichotomized based on a 10% cut-off for positively stained cells with immunohistochemical staining; HER2 status was assessed using fluorescent in situ hybridization (FISH) and immunohistochemistry assay, a sample was labelled as HER2 positive if there's amplification in FISH or, when no FISH result available, if it was graded 3+ through the immunohistochemistry assay. Patients with missing data in above risk factors were excluded in the multivariable Cox regression analysis. Proportional hazard (PH) was examined and corrected by stratification on variables that violate the assumption.

Figure 19:
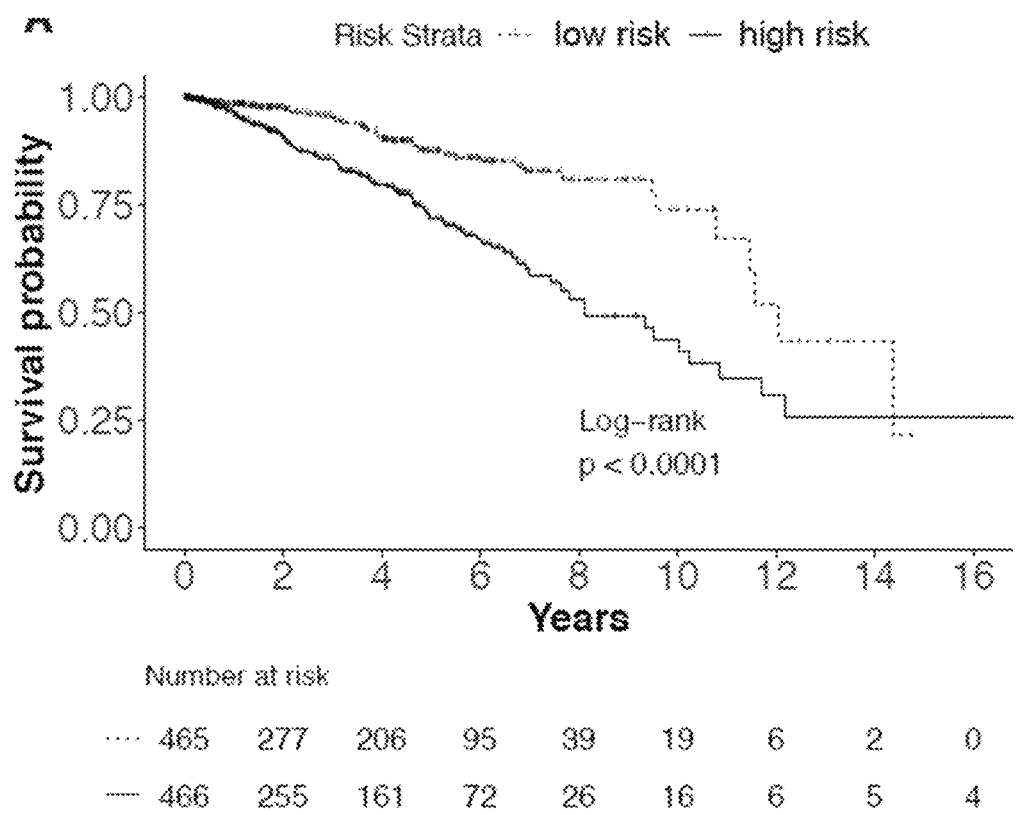
FIG. 19 Kaplan-Meier curves of recurrence free survival between patients dichotomized by risk score. Low risk group revealed a higher survival rate compared with high-risk group (P=7.5*10-9, Log-Rank test).

FIG. 19 shows a Kaplan Meier plot of survival outcomes based on a nested cross-validation procedure, clearly revealing that the risk for an event (progression or death) is different between the high- and low-risk groups (p-value<0.05).

Figure 20:
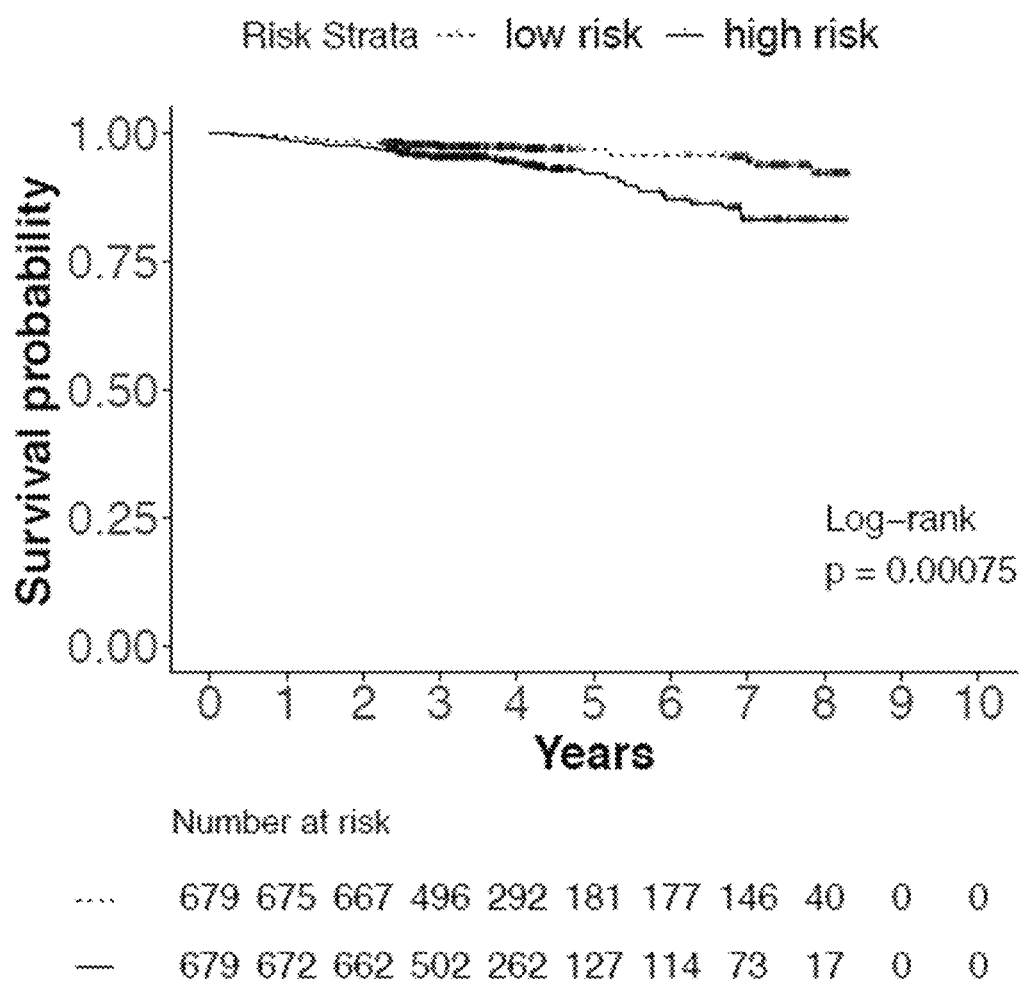
FIG. 20 Validation of proposed risk stratification model on external test sets. Kaplan-Meier curves of recurrence free survival for patients dichotomized by risk score from SöS-BC-1 cohort (P=0.00075, Log-Rank test).

FIG. 20 shows a Kaplan Meier plot of survival outcomes in the first independent external test set, clearly revealing that the risk for an event (progression or death) is different between the high- and low-risk groups (p-value<0.05).

Figure 21:
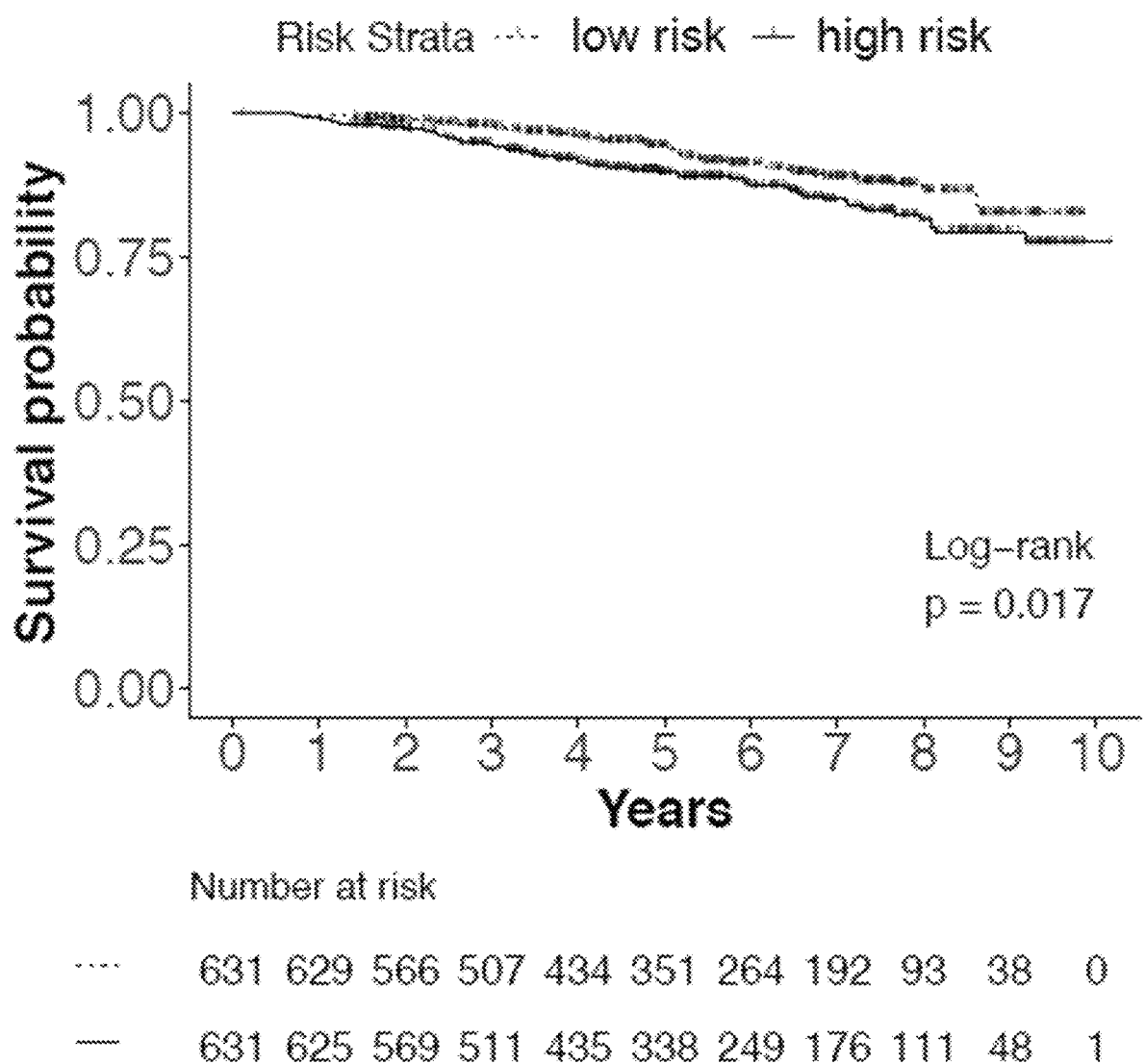
FIG. 21 Same analysis as in FIG. 20, with patients from SCAN-B-lund cohort (P=0.017, Log-Rank test).

FIG. 21 shows a Kaplan Meier plot of survival outcomes in the second independent test set, showing that the risk for an event (progression or death) is different between the high- and low-risk groups (p-value<0.05).

Investigation in Selected Features

Feature (predictor) selection is an intrinsic part of elastic net regularized models, where features having non-zero coefficients are included.

Selected features were further investigated by hierarchical clustering. Features were first normalized and clustered based on Euclidean distance in an agglomerative manner. We adopted 'average' as the method for cluster distance computation based on cophenetic correlation coefficient (13). The number of clusters was determined by consensus clustering with R package 'ConsensusClusterPlus'. The result from hierarchical clustering was plotted as a dendrogram colored by identified clusters using python package 'scipy'. Feature correlation heatmap was computed with spearman rank correlation and was generated with python package 'seaborn'.

In addition, the testing for differences in mean between the groups (t-test) were tested and the distributions were visualized using grouped boxplots. All texture features were log-transformed prior to t-test analysis and visualization. Results were adjusted for multiple testing using Benjamini-Hochberg's approach (14).

Software

The gene expression prediction was performed with Python (v.3.6.6) with packages OpenCV (v.3.4.1), OpenSlide (v.3.4.1 and API v.1.1.1) (15), Keras (v.2.2.4) with Tensorflow backend (16)(v.1.12). The texture features were extracted using Python package PyRadiomics v.3.0.1 (17). The Cox Proportional Hazards regression model with elastic net penalty was estimated using scikit-survival v.0.14.0(18). The model optimization procedure was implemented with methods provided in scikit-learn (v.0.23.2)(19). The survival analysis was carried out using R (v.3.6.3) with R packages ('survminer' and 'survival'). Other statistical analyses were performed with SciPy (v.1.5.2)(20) and multiple test adjustment was performed in statsmodels (v.0.11.1)(21).

REFERENCES TO EXAMPLES

1. Wang Y, Kartasalo K, Weitz P, Ács B, Valkonen M, Larsson C, et al. Predicting Molecular Phenotypes from Histopathology Images: A Transcriptome-Wide Expression-Morphology Analysis in Breast Cancer. Cancer Res 2021; 81:5115-26.
2. Wang Y, Acs B, Robertson S, Liu B, Solorzano L, Wählby C, et al. Improved breast cancer histological grading using deep learning. Ann Oncol 2022; 33:89-98.
3. Vallon-Christersson J, Häkkinen J, Hegardt C, Saal L H, Larsson C, Ehinger A, et al. Cross comparison and prognostic assessment of breast cancer multigene signatures in a large population-based contemporary clinical series. Scientific Reports 2019; 9. https://doi.org/10.1038/s41598-019-48570-x.
4. Perou C M, Sørlie T, Eisen M B, van de Rijn M, Jeffrey S S, Rees C A, et al. Molecular portraits of human breast tumours. Nature 2000; 406:747-52. https://doi.org/10.1038/35021093.
5. Woolf D K, Li S P, Detre S, Liu A, Gogbashian A, Simcock I C, et al. Assessment of the Spatial Heterogeneity of Breast Cancers: Associations Between Computed Tomography and Immunohistochemistry. Biomark Cancer 2019; 11:1179299X19851513.
6. Haralick R M, Shanmugam K, Dinstein I'hak. Textural Features for Image Classification. IEEE Trans Syst Man Cybern. 1973 November; SMC-3(6):610-21.
7. Thibault G, Fertil B, Navarro C, Pereira S, Cau P, Levy N, et al. Shape and texture indexes application to cell nuclei classification. International Journal of Pattern Recognition and Artificial Intelligence 2013; 27:1357002. https://doi.org/10.1142/s0218001413570024.
8. Galloway M M. Texture analysis using gray level run lengths. Computer Graphics and Image Processing 1975; 4:172-9. https://doi.org/10.1016/s0146-664x(75)80008-6.
9. Amadasun M, King R. Textural features corresponding to textural properties. IEEE Transactions on Systems, Man, and Cybernetics 1989; 19:1264-74. https://doi.org/10.1109/21.44046.
10. Zou H, Hastie T. Regularization and variable selection via the elastic net. Journal of the Royal Statistical Society: Series B (Statistical Methodology) 2005; 67:301-20. https://doi.org/10.1111/j.1467-9868.2005.00503.x.
11. Wang M, Klevebring D, Lindberg J, Czene K, Grönberg H, Rantalainen M. Determining breast cancer histological grade from RNA-sequencing data. Breast Cancer Res 2016; 18:48.
12. Early Breast Cancer Trialists' Collaborative Group (EBCTCG), Darby S, McGale P, Correa C, Taylor C, Arriagada R, et al. Effect of radiotherapy after breast-conserving surgery on 10-year recurrence and 15-year breast cancer death: meta-analysis of individual patient data for 10,801 women in 17 randomised trials. Lancet. 2011 Nov. 12; 378(9804):1707-16.
13. Sokal R R, James Rohlf F. The comparison of dendrograms by objective methods. TAXON 1962; 11:33-40. https://doi.org/10.2307/1217208.
14. Benjamini Y, Hochberg Y. Controlling the False Discovery Rate: A Practical and Powerful Approach to Multiple Testing. Journal of the Royal Statistical Society: Series B (Methodological) 1995; 57:289-300. https://doi.org/10.1111/j.2517-6161.1995.tb02031.x.
15. OpenSlide: A vendor-neutral software foundation for digital pathology. J Pathol Inform. 2013 Jan. 1; 4(1):27.
16. Abadi M, Agarwal A, Barham P, Brevdo E, Chen Z, Citro C, et al. TensorFlow: largescale machine learning on heterogeneous systems. 2015.
17. van Griethuysen J J M, Fedorov A, Parmar C, Hosny A, Aucoin N, Narayan V, et al. Computational Radiomics System to Decode the Radiographic Phenotype [Internet]. Vol. 77, Cancer Research. 2017. p. e104-7. Available from: http://dx.doi.org/10.1158/00085472.can-17-0339
18. S. Pölsterl, "scikit-survival: A Library for Time-to-Event Analysis Built on Top of scikit-learn," Journal of Machine Learning Research, vol. 21, no. 212, pp. 1-6, 2020.
19. Scikit-learn: Machine Learning in Python, Pedregosa et al., JMLR 12, pp. 28252830, 2011.
20. Virtanen P, Gommers R, Oliphant T E, Haberland M, Reddy T, Cournapeau D, Burovski E, Peterson P, Weckesser W, Bright J, Van Der Walt S J. SciPy 1.0: fundamental algorithms for scientific computing in Python. Nature methods. 2020 March; 17(3):261-72.
21. Seabold S, Perktold J. Statsmodels: Econometric and Statistical Modeling with Python. Proceedings of the Python in Science Conference 2010. https://doi.org/10.25080/majora-92bf1922-011.

The invention claimed is:

1. A method for quantifying texture features in a histological sample from a tumor sample, comprising:
   a) receiving a digital image of the histological sample, then
   b) dividing the digital image into a plurality of sub-areas and producing coordinates that describe how the sub-areas are arranged in relation to each other, then
   c) using a trained machine learning model to predict a presence of at least one biological feature selected from the group consisting of: gene expression, protein expression, RNA level, presence of a mutation, for each of the sub-areas, where a probability for the presence of the biological feature is represented by a value, then
   d) using the coordinates from step b) to form a data matrix by arranging the values for the probabilities of the biological features in the same way as the sub-areas are arranged in relation to the digital image, then
   e) applying image analysis to the data matrix for a set of texture features, to produce a quantification of at least one texture feature.

2. The method of claim 1, where the trained machine learning model of step c) has been obtained by:
   i. receiving a training first data set comprising a plurality of digital images of histological samples and data representing quantification of the biological feature in the tumors from which the histological samples were taken, to a machine learning model; and then
   ii. correlating the presence of the biological feature to features in the images, to produce a trained machine learning model.

3. The method of claim 1, wherein step a) comprises receiving a second dataset comprising a plurality of images of histological samples from cancer patients where a clinical outcome for each of the patients is known, and where the method further comprises: carrying out steps b)-e) for each of the digital images received in step a), to obtain a third training data set comprising quantifications, for each of the images, of at least one texture feature, and clinical outcome data for the patients, then
   correlating the clinical outcome to the quantifications of the texture feature to obtain a second trained machine learning model.

4. The method of claim 1, wherein step a) comprises receiving a second dataset comprising a plurality of images of histological samples from cancer patients where a clinical outcome for each of the patients is known, and wherein the method further comprises:
   carrying out steps b)-e) for each of the digital images received in step a), to obtain a third training data set comprising quantifications, for each of the images, of at least one texture feature, and clinical outcome data for the patients, then;
   correlating the clinical outcome to the quantifications of the texture feature to obtain a second trained machine learning model,
   receiving a digital image of histological sample from a patient and carrying steps a) to e) for the image, in order to produce a quantification of at least one texture feature, and
   providing the quantification of the at least one texture feature to the second trained machine learning model to predict a clinical outcome for the patient.

5. The method of claim 1 where the biological feature is a gene expression, a protein expression, or a presence of a mutation.

6. The method of claim 1 where step c) is carried out for a plurality of biological features.

7. The method of claim 1 where step c) is carried out for a plurality of biological features and where the plurality of biological features comprises gene expression of genes comprised in a predefined set of genes.

8. The method of claim 1 where the histological samples are from breast cancer.

9. A system arranged to;
   a) receive a digital image of a histological sample, then
   b) divide the digital image into a plurality of sub-areas, and produce coordinates that describe how the sub-areas are arranged in relation to each other, then
   c) using a trained machine learning model to predict a presence of at least one biological feature selected from the group consisting of: gene expression, protein expression, RNA level,
   presence of a mutation for each of the sub-areas, where a probability for the presence of the biological feature is represented by a value, then
   d) using the coordinates from step b) to form a data matrix by arranging the values for the probabilities of the biological features in the same way as the sub-areas are arranged in relation to the digital image, then
   e) applying image analysis to the data matrix for a set of texture features, to produce a quantification of at least one texture feature.

10. A system arranged to receive a digital image of a histological sample from a patient and configured to provide a diagnosis for the patient, wherein the system is arranged to provide the digital image to a second trained machine learning model to which has been obtained by:
    A. receiving a second dataset comprising a plurality of images of histological samples from cancer patients where a clinical outcome for each of the patients is known,
    B. carrying out the following steps a)-e) for each of the digital images received in step A,
       a) receiving a digital image of the histological sample, then
       b) dividing the digital image into a plurality of sub-areas and producing coordinates that describe how the sub-areas are arranged in relation to each other, then
       c) using a trained machine learning model to predict a presence of at least one biological feature selected from the group consisting of: gene expression, protein expression, RNA level, presence of a mutation, for each of the sub-areas, where a probability for the presence of the biological feature is represented by a value, then
       d) using the coordinates from step b) to form a data matrix by arranging the values for the probabilities of the biological features in the same way as the sub-areas are arranged in relation to the digital image, then
       e) applying image analysis to the data matrix for a set of texture features, to produce a quantification of at least one texture feature to obtain a third training data set comprising quantifications, for each of the images, of at least one texture feature, and clinical outcome data for the patients, then C. correlating the clinical outcome to the quantifications of the texture feature to obtain a second trained machine learning model.

* * * * *